United States Patent
Jiménez et al.

(10) Patent No.: US 11,140,125 B2
(45) Date of Patent: Oct. 5, 2021

(54) NODE, ANOTHER NODE, AND METHODS PERFORMED THEREBY FOR SUPPORTING DOMAIN NAME SYSTEM OVER CONSTRAINED APPLICATION PROTOCOL

(71) Applicant: Telefonaktiebolaget LM Ericsson (publ), Stockholm (SE)

(72) Inventors: Jaime Jiménez, Helsinki (FI); Oscar Novo Diaz, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/963,606

(22) PCT Filed: Jan. 26, 2018

(86) PCT No.: PCT/EP2018/051980
§ 371 (c)(1),
(2) Date: Jul. 21, 2020

(87) PCT Pub. No.: WO2019/145043
PCT Pub. Date: Aug. 1, 2019

(65) Prior Publication Data
US 2021/0067482 A1   Mar. 4, 2021

(51) Int. Cl.
*H04L 29/12* (2006.01)
*H04L 29/06* (2006.01)

(52) U.S. Cl.
CPC ...... *H04L 61/1511* (2013.01); *H04L 61/1541* (2013.01); *H04L 63/166* (2013.01)

(58) Field of Classification Search
None
See application file for complete search history.

(56) References Cited

U.S. PATENT DOCUMENTS

| 2018/0191666 A1* | 7/2018 | Rahman | H04L 61/1511 |
| 2019/0230167 A1* | 7/2019 | Laari | H04L 61/1511 |

OTHER PUBLICATIONS

Bormann, C., et al., "Block-Wise Transfers in the Constrained Application Protocol (CoAP)", Internet Engineering Task Force (IETF), Aug. 2016, pp. 1-38.
(Continued)

Primary Examiner — Brian Whipple
(74) Attorney, Agent, or Firm — Murphy, Bilak & Homiller, PLLC

(57) ABSTRACT

A method performed by a node (111) supporting operation on a Constrained Application Protocol (CoAP), but incapable of supporting operation on a Domain Name System (DNS) protocol. The node (111) encodes (402) a DNS query into a first message (601, 701), which has a format supported by the CoAP. The DNS query is mapped to the CoAP format of the first message (601, 701) based on a mapping scheme. The node (111) then initiates sending (403) the first message (601, 701) to another node (112) operating in the communications network (100). The another node (112) supports operation on the CoAP and on the DNS protocol. The node (111) finally receives (404) a second message (620, 706) from the another node (112), which has the format supported by the CoAP. The second message (620, 706) comprises the DNS response to the sent DNS query. The DNS response is mapped to the CoAP format of the second message (620, 706) based on the mapping scheme.

20 Claims, 12 Drawing Sheets

(56) References Cited

OTHER PUBLICATIONS

Bormann, C., et al., "Terminology for Constrained-Node Networks", Internet Engineering Task Force (IETF), May 2014, pp. 1-17.
Carballido Villaverde, Berta, et al., "Service Discovery Protocols for Constrained Machine-to-Machine Communications", IEEE Communications Surveys & Tutorials, vol. 16, No. 1, First Quarter 2014, 2014, pp. 41-60.
Castellani, Angelo P., et al., "[core] CoAP-DNS mapping", IETF; Mail Archive, Mar. 24, 2013, pp. 1-1.
Cheshire, S., et al., "DNS-Based Service Discovery", Internet Engineering Task Force (IETF), Feb. 2013, pp. 1-49.
Hoffman, P., et al., "DNS Queries over HTTPS", Network Working Group, Jun. 6, 2017, pp. 1-12.
Lyanage, Mohan, et al., "Lightweight Mobile Web Service Provisioning for Sensor Mediation", 2015 IEEE International Conference on Mobile Services, 2015, pp. 57-64.
Mockapetris, P., "Domain Names—Concepts and Facilities", Network Working Group, Nov. 1987, pp. 1-56.
Mockapetris, P., "Domain Names—Implementation and Specification", Network Working Group, Nov. 1987, pp. 1-56.
Serna, Fermin J., et al., "Behind the Masq: Yet more DNS, and DHCP, vulnerabilities", Google Online Security Blog, Oct. 2, 2017, pp. 1-5.
Shelby, Z., et al., "The Constrained Application Protocol (CoAP)", Internet Engineering Task Force (IETF), Jun. 2014, pp. 1-113.
Unknown, Author, "JSON API for DNS over HTTPS (DoH)", Google DNS, Jun. 26, 2019, pp. 1-5.

\* cited by examiner a)

b)

| Section | Meaning | CoAP Mapping |
|---|---|---|
| Message ID | May identify the transaction | May not be needed –May already be defined in CoAP in a *message* ID in the header |
| QR | May identify if the message is a query or a response | May not be needed – CoAP may already define in the *code* field of the header if a message is a request (0) or a response (2) |
| OPCODE | May identify the request/operation type<br><br>| Value | Use |<br>|---|---|<br>| 0 | standard query |<br>| 1 | Inverse query |<br>| 2 | DNS status request | | CoAP may define in the URI-*Path*, which is one of the options in a CoAP message, the following mapping operations: QUERY, IQUERY, STATUS. |
| AA | Authoritative Answer. Valid in responses only. | Embodiments herein may define a new option value with number 100* and name AA*. |
| TC | TrunCation - May specify that this message was truncated | Since CoAP has its own mechanism to truncate the messages, this option may not need to be mapped again in the CoAP messages. |
| RD | Recursion Desired - this bit may be set in a query and is copied into the response if recursion supported by this Name Server. | Embodiments herein may define yet another new option value with number 101* and name RD*. |
| RA | Recursion Available - this bit may be valid in a response (answer) and may denote whether recursive query support is available | Embodiments herein may define a further new option value with number 102* and name RA*. |
| RCODE | May identify the response type to the query:<br><br>| Value | Use |<br>|---|---|<br>| 0 | No error |<br>| 1 | Format Error |<br>| 2 | Server Failure |<br>| 3 | Name Error |<br>| 4 | Not Implemented |<br>| 5 | Refuse | | The response type may be mapped to the already defined CoAP Response codes<br><br>| DNS | CoAP |<br>|---|---|<br>| 0 | 2.05 Content |<br>| 1 | 4.00 Bad Request |<br>| 2 | 5.00 Internal Server Error |<br>| 3 | 4.04 Not Found |<br>| 4 | 5.01 Not Implemented |<br>| 5 | 4.03 Forbidden | |
| QDCOUNT | May indicate a number of entries in the Question Section | May not be needed – the questions entries may be defined using the *URI-query* option defined in CoAP |
| ANCOUNT | May indicate a number of resource records in the Answer Section | May not be needed – may be defined in the payload |
| NSCOUNT | May indicate a number of name server resource records in the Authority Section | May not be needed – may be defined in the payload |
| ARCOUNT | May indicate a number of resource records in the Additional Section | May not be needed – may be defined in the payload |

Table 1

Figure 10

| Section | Meaning | CoAP Mapping |
|---|---|---|
| QNAME | The name being queried, its content may depend upon the QTYPE (below); for example, a request for an A record may typically require a host part, such as, www.example.com, an MX query may only require a base domain name, such as, example.com. | That information may be mapped in the *URI-query* option defined in CoAP as name. The URI-Query option field may be used to retrieve only the resources that match a specific pattern, e.g., /.well-known/core?name=www.example.com |
| QTYPE | The resource records being requested. These values may be assigned by IANA and the following may be the most commonly used values:<br><br>| Value | Meaning |<br>|---|---|<br>| 0 | May request the A record for the domain name |<br>| 2 | May request the NS record(s) for the domain name |<br>| 5 | May request the CNAME record(s) for the domain name |<br>| 6 | May request the SOA record(s) for the domain name |<br>| 11 | May request the *Well Known Service* (WKS) record(s) for the domain name |<br>| 12 | May request the PTR record(s) for the domain name |<br>| 15 | May request the MX record(s) for the domain name |<br>| 28 | May request the AAAA record(s) for the domain name |<br>| 33 | May request the SRV record(s) for the domain name |<br>| 255 | May request ANY resource record, typically SOA, MX, NS and MX | | That information may be mapped in the *URI-query* option defined in CoAP as type. That option may define the same integer values as the QTYPE values in the DNS. The URI-Query option field may be used to retrieve only the resources that match a specific pattern, e.g., /.well-known/core?type=www.example.com |
| QCLASS | The CLASS of resource records being requested e.g. Internet, CHAOS etc. The most common value may be IN (Internet) | QCLASS may be always IN in the IoT scenarios. This way, this field may be skipped from the mapping since it may be considered obvious. |

Table 2

Figure 11

NODE, ANOTHER NODE, AND METHODS PERFORMED THEREBY FOR SUPPORTING DOMAIN NAME SYSTEM OVER CONSTRAINED APPLICATION PROTOCOL

TECHNICAL FIELD

The present disclosure relates generally to a node and methods performed thereby for supporting Domain Name System (DNS) over Constrained Application Protocol (CoAP). The present disclosure also relates generally to another node, and methods performed thereby for supporting DNS over CoAP. The present disclosure further relates generally to a computer program product, comprising instructions to carry out the actions described herein, as performed by the node, or the another node. The computer program product may be stored on a computer-readable storage medium.

BACKGROUND

Computer systems may comprise one or more nodes. A node may comprise one or more processors which, together with computer program code may perform different functions and actions, a memory, a receiving and a sending port. A node may be, for example, a server. Nodes may be comprised in a communications network.

Nodes within a communications network may be wireless devices, e.g., stations (STAs), User Equipments (UEs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g. between two wireless devices, between a wireless device and a regular telephone, and/or between a wireless device and a server via a Radio Access Network (RAN), and possibly one or more core networks, comprised within the telecommunications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The communications network may cover a geographical area which may be divided into cell areas, each cell area being served by another type of node, a network node or Transmission Point (TP), for example, an access node such as a Base Station (BS), e.g. a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies.

In 3rd Generation Partnership Project (3GPP) Long Term Evolution (LTE), base stations, which may be referred to as eNodeBs or even eNBs, may be directly connected to one or more core networks. All data transmission in LTE is controlled by the radio base station.

The standardization organization 3GPP is currently in the process of specifying a New Radio Interface called NR or 5G-UTRA, as well as a Fifth Generation (5G) Packet Core Network, which may be referred to as Next Generation Core Network, abbreviated as NG-CN, NGC or 5G CN.

Internet of Things (IoT)

The Internet of Things (IoT) may be understood as an internetworking of communication devices, e.g., physical devices, vehicles, which may also referred to as "connected devices" and "smart devices", buildings and other items—embedded with electronics, software, sensors, actuators, and network connectivity that may enable these objects to collect and exchange data. The IoT may allow objects to be sensed and/or controlled remotely across an existing network infrastructure.

"Things," in the IoT sense, may refer to a wide variety of devices such as heart monitoring implants, biochip transponders on farm animals, electric clams in coastal waters, automobiles with built-in sensors, DNA analysis devices for environmental/food/pathogen monitoring, or field operation devices that may assist firefighters in search and rescue operations, home automation devices such as the control and automation of lighting, heating, e.g. a "smart" thermostat, ventilation, air conditioning, and appliances such as washer, dryers, ovens, refrigerators or freezers that may use Wi-Fi for remote monitoring. These devices may collect data with the help of various existing technologies and then autonomously flow the data between other devices.

Machine Type Communication (MTC)

Machine Type Communication (MTC) has, especially in the context of the Internet of Things (IoT), shown to be a growing market segment. An MTC device may be a communication device, typically a wireless communication device or simply wireless device, that is a self and/or automatically controlled unattended machine and that is typically not associated with an active human user in order to generate data traffic. An MTC device may be typically more simple, and typically associated with a more specific application or purpose, than, and in contrast to, a conventional mobile phone or smart phone.

MTC involves communication in a wireless communication network to and/or from MTC devices, in which communication typically may be of quite different nature and with other requirements than communication associated with e.g. conventional mobile phones and smart phones. In the context of the IoT it is evident that MTC traffic will be increasing and thus needs to be increasingly supported in wireless communication systems.

Constrained Application Protocol (CoAP)

Constrained Application Protocol (CoAP) may be understood as a specialized Internet Application Protocol for constrained devices, as defined in RFC 7228. It may be understood to enable constrained devices to communicate with the wider Internet using similar protocols. A constrained device or constrained node may be understood as a node where some of the characteristics of Internet nodes may not be attainable, often due to cost constraints and/or physical constraints on characteristics such as size, weight, and available power and energy.

Domain Name System (DNS)

The Domain Name System (DNS) [1] may be understood as a hierarchical decentralized naming system for computers, services, or other resources connected to the Internet or a private network. DNS may be understood to translate domain names to the numerical Internet Protocol (IP) addresses, which may be needed for locating and identifying computer services and devices with the underlying network protocols. A domain name may be understood as an identification string that may define a realm of administrative autonomy, authority or control within the Internet. Internet name servers and a communication protocol may implement the Domain Name System. A DNS name server may be understood as a server that stores the DNS records for a domain; the DNS name server may respond with an answer to a query against its database. The Domain Name System may also be understood to define the DNS protocol, a detailed specification of the data structures and data communication exchanges used in the DNS.

The most common types of records stored in the DNS database may be for Start of Authority (SOA), IP addresses (A and AAAA), Simple Mail Transport Protocol (SMTP) Mail Exchangers (MX), Name Servers (NS), PoinTers for Reverse DNS lookups, a.k.a. Reverse-lookup Pointer Records (PTR), and domain name aliases, such as Canonical Name Record (CNAME). SOA may be understood to specify authoritative information about a DNS zone, including the primary name server, the email of the domain administrator, the domain serial number, and several timers relating to refreshing the zone. An IP address may be understood as a numerical label assigned to each device connected to a computer network that uses the Internet Protocol for communication. A and AAAA may be understood to correspond to the specific IP address of a domain name, wherein A may be understood as an IPv4 record, while AAAA may be understood as a current IPv6 record. SMTP may be understood as an Internet standard for electronic mail transmission. An MX may be understood as a computer that may transfer electronic mail messages from one computer to another using a client-server application architecture. A NS may be understood as a server that may implement a network service for providing responses to queries against a directory service. It may be understood to translate an often humanly meaningful, text-based identifier to a system-internal, often numeric identification or addressing component. This service is performed by the server in response to a service protocol request. A server component of the DNS may be considered an example of a name server. PTR may be understood to be used in the querying of the DNS to determine the domain name associated with an IP address. Another type of record is the Well-Known Service (WKS) record. The WKS record may be understood to describe the services that may be provided by a specified host. A host may have no more than two WKS records.

Although not intended to be a general purpose database, DNS may store records for other types of data for either automatic lookups, such as Domain Name System Security Extensions (DNSSEC) records, or for human queries such as Responsible Person (RP) records. DNSSEC may be understood as a suite of Internet Engineering Task Force (IETF) specifications for securing certain kinds of information provided by the DNS as used on Internet Protocol (IP) networks. It may be considered as a set of extensions to DNS which provide to DNS clients (resolvers) origin authentication of DNS data, authenticated denial of existence, and data integrity, but not availability or confidentiality. An RP-record may be understood to specify the mailbox of the person responsible for a host, that is, a domain name.

DNS-Based Service Discovery (DNS-SD) may be understood to be a service that defines a conventional method of configuring DNS PTR, Service (SRV), and Text (TXT) resource records to facilitate discovery of services, such as CoAP servers in a subdomain, using the existing DNS infrastructure. RFC6763 offers more details about the specification. A SRV record may be understood as a specification of data in the DNS defining the location, i.e. the hostname and port number, of servers for specified services. A TXT record may be understood as a type of resource record in the DNS that may be used to provide the ability to associate some arbitrary and unformatted text with a host or other name, such as human readable information about a server, network, data center, and other accounting information.

In existing methods, DNS has a number of problems. Internet does not always provide end to end reachability for DNS. Additionally, DNS has more than a handful of vulnerabilities in terms of security.

SUMMARY

It is an object of embodiments herein to improve the communication of constrained devices in a communications network. It is a particular object of embodiments herein to enable the communication of constrained devices with servers supporting DNS in a communications network.

According to a first aspect of embodiments herein, the object is achieved by a method performed by a node. The node operates in a communications network. The node supports operation on a Constrained Application Protocol (CoAP). However, the node is incapable of supporting operation on a Domain Name System (DNS) protocol. The node encodes a DNS query into a first message. The first message has a format supported by the CoAP. The DNS query is mapped to the CoAP format of the first message based on a mapping scheme. The node then initiates sending the first message to another node operating in the communications network. The another node supports operation on the CoAP and on the DNS protocol. The node then receives a second message from the another node. The second message has the format supported by the CoAP. The second message comprises a DNS response to the sent DNS query. The DNS response is mapped to the CoAP format of the second message based on the mapping scheme.

According to a second aspect of embodiments herein, the object is achieved by a method performed by another node. The another node operates in the communications network. The another node supports operation on the CoAP and operation on the DNS, protocol. The another node comprises receiving the first message from the node operating in the communications network. The node supports operation on the CoAP. However, the node is incapable of supporting operation on the DNS protocol. The received first message comprises the DNS query. The received first message has the format supported by the CoAP. The DNS query is mapped to the CoAP format of the first message based on the mapping scheme. The another node encodes the DNS response to the received DNS query into the second message. The second message has the format supported by the CoAP. The DNS response is mapped to the CoAP format of the second message based on the mapping scheme. The another node then initiates sending the second message to the node.

According to a third aspect of embodiments herein, the object is achieved by the node, configured to operate in the communications network. The node is further configured to support operation on the CoAP. The node is configured to be incapable of supporting operation on the DNS protocol. The node is further configured to encode the DNS query into the first message. The first message is configured to have the format configured to be supported by the CoAP. The DNS query is configured to be mapped to the CoAP format of the first message based on the mapping scheme. The node is further configured to initiate sending the first message to the another node, configured to operate in the communications network. The another node is further configured to support operation on the CoAP and on the DNS protocol. The node is also configured to receive the second message from the another node. The second message is configured to have the format configured to be supported by the CoAP. The second message is further configured to comprise the DNS response to the DNS query configured to be sent. The DNS response is configured to be mapped to the CoAP format of the second message based on the mapping scheme.

According to a fourth aspect of embodiments herein, the object is achieved by the another node, configured to operate in the communications network. The another node is configured to support operation on the CoAP, and operation on the DNS protocol. The another node is further configured to receive the first message from the node, configured to operate in the communications network. The node is being further configured to support operation on the CoAP. However, the node is further configured to be incapable of supporting operation on the DNS protocol. The first message configured to be received is configured to comprise the DNS query. The first message configured to be received is further configured to have the format configured to be supported by the CoAP. The DNS query is configured to be mapped to the CoAP format of the first message based on the mapping scheme. The another node is further configured to encode the DNS response to the DNS query configured to be received into the second message. The second message is configured to have the format configured to be supported by the CoAP. The DNS response is configured to be mapped to the CoAP format of the second message based on the mapping scheme. The another node is also configured to initiate sending the second message to the node.

According to a fifth aspect of embodiments herein, the object is achieved by a computer program, comprising instructions which, when executed on at least one processor, cause the at least one processor to carry out the method performed by the node.

According to a sixth aspect of embodiments herein, the object is achieved by a computer-readable storage medium, having stored thereon the computer program, comprising instructions which, when executed on at least one processor, cause the at least one processor to carry out the method performed by the node.

According to a seventh aspect of embodiments herein, the object is achieved by a computer program, comprising instructions which, when executed on at least one processor, cause the at least one processor to carry out the method performed by the another node.

According to an eighth aspect of embodiments herein, the object is achieved by a computer-readable storage medium, having stored thereon the computer program, comprising instructions which, when executed on at least one processor, cause the at least one processor to carry out the method performed by the another node.

By the node encoding the DNS query into the first message having the format supported by the CoAP, based on the mapping scheme, the node is able to communicate with the another node supporting operation on the CoAP and on the DNS protocol, and receive the second message comprising the DNS response. By the second message having the format supported by the CoAP, the node is enabled to then process the second message and extract DNS data.

Therefore, end to end DNS connectivity is provided in scenarios, e.g., IoT scenarios, where native DNS may not be supported.

BRIEF DESCRIPTION OF THE DRAWINGS

Examples of embodiments herein are described in more detail with reference to the accompanying drawings, according to the following description.

FIG. 10 is a table showing an example CoAP mapping scheme according to some embodiments.

FIG. 11 is a table showing how certain fields may be mapped in CoAP to a first message, according to a non-limiting example of a mapping scheme.

DETAILED DESCRIPTION

Figure 1:
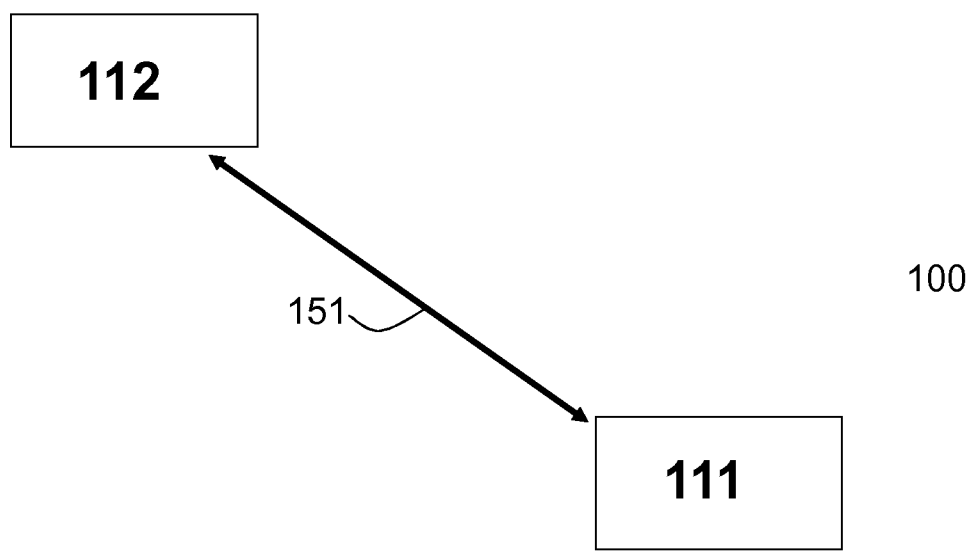
FIG. 1 is a schematic diagram illustrating two non-limiting examples in a) and b), respectively, of a communications network, according to embodiments herein.
Figure 1:
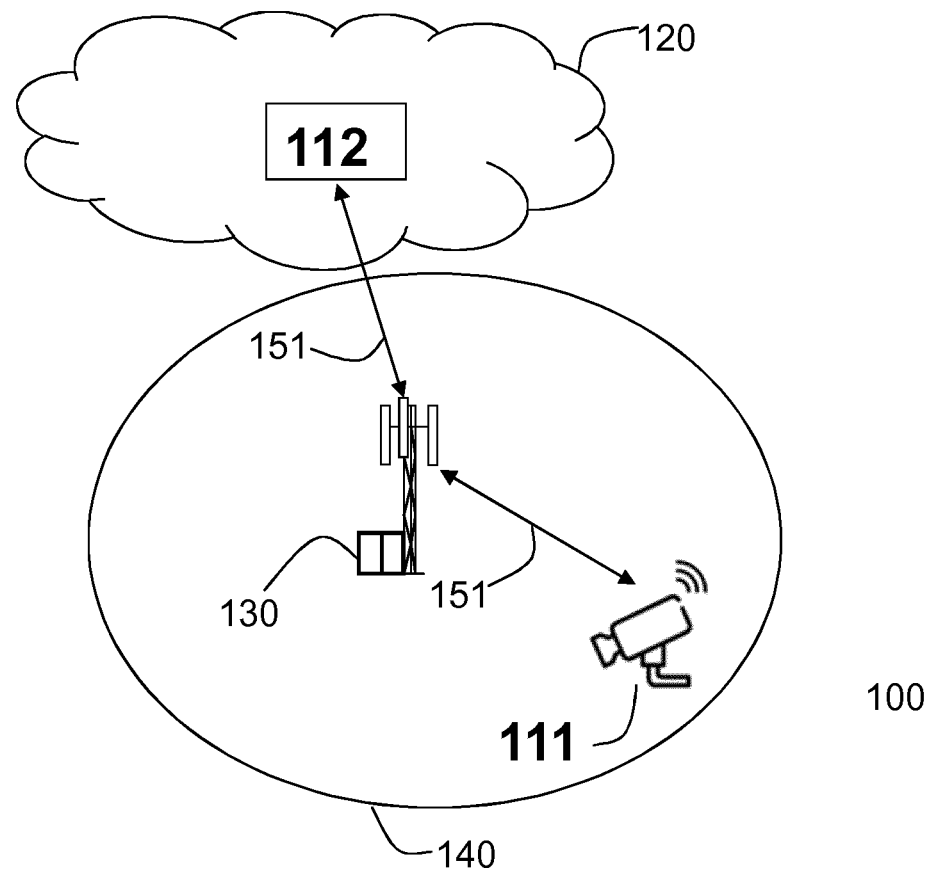

As part of the development of embodiments herein, a problem with exiting methods will first be identified and discussed.

Internet does not always provide end to end reachability for DNS. End to end reachability refers to the ability of any given two nodes, to communicate on internet. Internet design and specific devices within a network may comprise mechanisms such as firewalls which may block some specific DNS communications within internet, thereby disrupting end to end reachability. For example, an on-path network device may spoof DNS responses. That is, a network device may gain unauthorized access to a DNS message. Another example is that an on-path network device may block DNS requests, meaning that the network device may not transfer a DNS request to the receiver device. Yet another example is that an on-path network device may just redirect DNS queries to different DNS servers that may give less-than-honest answers. There are more than a handful of DNS vulnerabilities, including some very recent ones [2].

A further problem of existing methods in terms of providing end to end reachability is that in certain IoT scenarios, some devices may be too constrained to support DNS and may sometimes experience problems with end to end connectivity in places where constrained protocols such as CoAP [3] would flow freely. Usage of CoAP has the advantage, not only that it may be used by the constrained devices, but also that it may offer additional security features over DNS. For instance, since CoAP may rely on the User Datagram Protocol (UDP) and asynchronous messages, it may provide a mechanism to detect spoofing attacks.

Several embodiments are comprised herein, which address these end to end reachability problems and security problems of the existing methods. Embodiments herein may be understood to provide a solution to encode DNS queries and responses in CoAP [3]. This enables the Domain Name System (DNS) to function over certain IoT scenarios where existing DNS methods experience problems. Embodiments herein may be understood to re-use CoAP methods, error codes, and other semantics to the greatest extend possible. In general, embodiments herein may be understood as enabling communicating DNS over CoAP. Particular embodiments herein may be understood to define the protocol details for sending DNS queries and getting DNS responses over CoAP [3] using Datagram Transport Layer Security (DTLS) for integrity and confidentiality, as will be described later.

Embodiments herein may be particularly useful for specific CoAP use cases, where the DNS protocol is not implemented in constrained CoAP nodes.

The embodiments will now be described more fully hereinafter with reference to the accompanying drawings, in which examples are shown. In this section, embodiments herein are illustrated by exemplary embodiments. It should be noted that these embodiments are not mutually exclusive. Components from one embodiment or example may be tacitly assumed to be present in another embodiment or example and it will be obvious to a person skilled in the art how those components may be used in the other exemplary embodiments.

FIG. 1 depicts two non-limiting examples, in panels "a" and "b", respectively, of a communications network 100, in which embodiments herein may be implemented. In some example implementations, such as that depicted in the non-limiting example of FIG. 1a, the communications network 100 may be a computer network. In other example implementations, such as that depicted in the non-limiting example of FIG. 1b, the communications network 100 may be implemented in a telecommunications network 100, sometimes also referred to as a cellular radio system, cellular network or wireless communications system. In some examples, the telecommunications network may comprise network nodes which may serve receiving nodes, such as wireless devices, with serving beams.

The telecommunications network may for example be a Low Power Wide Area Network (LPWAN). LPWAN technologies may comprise Long Range physical layer protocol (LoRa), Haystack, SigFox, LTE-M, and Narrow-Band IoT (NB-IoT).

In some examples, the telecommunications network may for example be a network such as 5G system, or Next Gen network. The telecommunications network may also support other technologies, such as a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as IPv6 over Low-Power Wireless Personal Area Networks (6LowPAN), Zigbee, Z-Wave, Bluetooth Low Energy (BLE), or any cellular network or system.

The communications network 100 comprises a plurality of nodes, whereof a node 111, and an another node 112 are depicted in FIG. 1. Each of the node 111, and the another node 112 may be understood, respectively, as a computer system, and another computer system. In some examples, the another node 112 may be implemented, as depicted in the non-limiting example of FIG. 1b, as a standalone server in e.g., a host computer in the cloud 120. Each of the node 111, and the another node 112 may in some examples be a distributed node or distributed server, with some of their respective functions being implemented locally, e.g., by a client manager, and some of its functions implemented in the cloud 120, by e.g., a server manager. Yet in other examples, each of the node 111 and the another node 112 may also be implemented as processing resources in a server farm. Each of the node 111 and the another node 112 may be under the ownership or control of a service provider, or may be operated by the service provider or on behalf of the service provider.

The node 111 may be a wireless device comprised in the communications network 100, such as a Bluetooth Low Energy (BLE) User Equipment (UE), or a UE which may also be known as being enabled to communicate data, with another entity, such as a server, a laptop, a Machine-to-Machine (M2M) device, device equipped with a wireless interface, or any other radio network unit capable of communicating over a wired or radio link in a communications system. Any of the wireless devices comprised in the communications network 100 is enabled to communicate wirelessly in the communications network 100. The communication may be performed e.g., via a RAN and possibly one or more core networks, comprised within the communications network 100. The node 111 supports operation on CoAP, and the node 111 is incapable of supporting operation on the DNS protocol. Incapable of supporting may be understood as lacking support, or not being configured to support, for example. The node 111 may typically be a constrained device in e.g., an IoT network. In contrast, the another node 112 supports operation on the CoAP and on the DNS protocol.

The communications network 100 may cover a geographical area which, which in some embodiments may be divided into cell areas, wherein each cell area may be served by a radio network node 130, although, one radio network node may serve one or several cells. In the example of FIG. 1b, the radio network node 130 serves a cell 140. The radio network node 130 may be e.g., a gNodeB. That is, a transmission point such as a radio base station, for example an eNodeB, or a Home Node B, a Home eNode B or any other network node capable to serve a wireless device, such as a user equipment or a machine type node in the communications network 100. The radio network node 130 may be of different classes, such as, e.g., macro eNodeB, home eNodeB or pico base station, based on transmission power and thereby also cell size. In some examples wherein the communications network 100 may be a non-cellular system, the radio network node may serve receiving nodes with serving beams. The radio network node 130 may support one or several communication technologies, and its name may depend on the technology and terminology used. Any of the radio network nodes that may be comprised in the communications network 100 may be directly connected to one or more core networks.

The node 111 is configured to communicate within the communications network 100 with the another node 112 over a link 151, e.g., a radio link, an infrared link, or a wired link. The link 151 may be understood to be comprised of a plurality of individual links.

The link 131 may be a direct link or it may go via one or more computer systems or one or more core networks in the communications network 100, which are not depicted in FIG. 1, or it may go via an optional intermediate network. The intermediate network may be one of, or a combination of more than one of, a public, private or hosted network; the intermediate network, if any, may be a backbone network or the Internet; in particular, the intermediate network may comprise two or more sub-networks, which is not shown in FIG. 1.

In general, the usage of "first", "second", "third", "fourth", etc. herein may be understood to be an arbitrary way to denote different elements or entities, and may be understood to not confer a cumulative or chronological character to the nouns they modify.

DNS message exchanges may be understood to be based on the principle of client/server computing, as the CoAP protocol. In a particular exchange, the node 111 may act as a client, initiating the communication by sending a query. The node 111 may be considered a "DNS Application Programming Interface (API) client", although the node 111 does not itself support DNS. The another node 112 may then act as the server by responding to the query with an answer or response. This "query/response" behavior may be considered an integral part of DNS, and is reflected in the format used for DNS messages. A DNS message and a CoAP protocol message in the existing methods have different formats, and an overview of these formats may be useful in understanding the methods performed by the node 111 and the another node 112 which will be described later. A format of a message, as used herein, may be understood as a scheme or way to arrange or organize information in the message. It may be understood as a systematic way to arrange information in the message, for example, with fields or a certain size, and comprising certain values.

Figure 2:
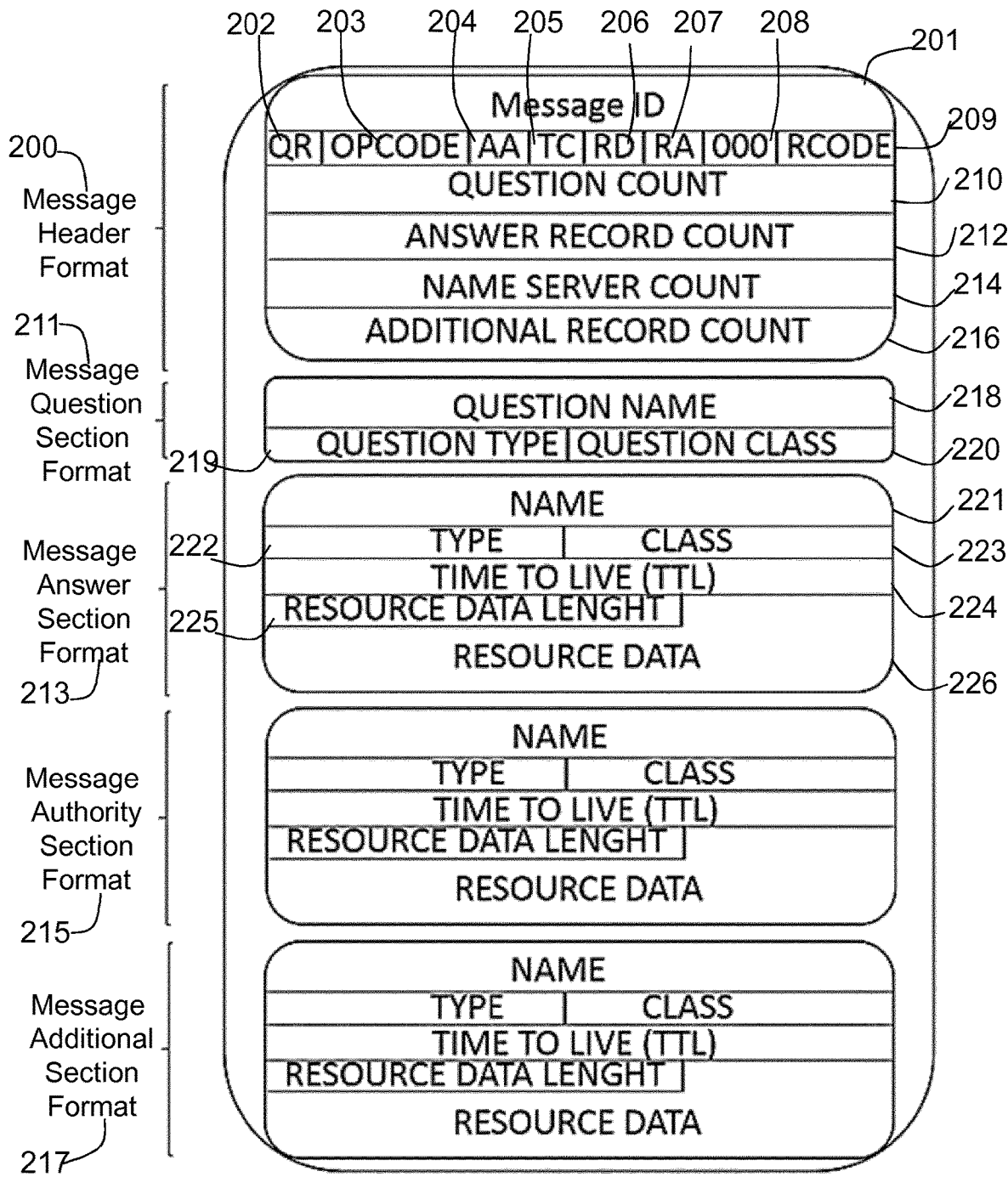
FIG. 2 is a schematic diagram illustrating an example of a DNS format.

FIG. 2 shows an illustration of the DNS general message format in existing methods. A common message format may be used for DNS queries and responses. This message format may contain five sections that provide a place for the query that may be asked by a client, the answer(s) that may be provided by a DNS server, and a header, comprising information that may control the entire process. The message format may be divided in five sections. As may be seen in FIG. 2, a first section in the format of a DNS message is the Message Header section 200. The Header may always be present in all messages and may be fixed in length. The Message Header section 200 may contain fields that may describe the type of message and provide information about it. A Message Identification (ID) field 201 may be used to uniquely identify a message. A flag (QR) 202 may indicate whether a message is a query or a response. An Operation Code (OPCODE) field 203 may be a four bit field, and may identify a type of request of an operation. For example, a value of the OPCODE may correspond to a standard query, an inverse query or a server status request, among other values. An Authoritative Answer (AA) field 204 may indicate that the responding name server is an authority for the domain name. A TrunCation (TC) field 205 may specify whether or not a message is truncated. A truncated message may be understood as a message that may be split and sent in smaller packets due to the length constrains in the transmission channel. A Recursion Desired (RD) field 206 may be set in a query and may then be copied into the response if recursion is supported by a recipient Name Server. Recursive DNS may be understood to refer to the servers that may search the Internet looking for answers to questions that have been asked. When a DNS server receives a recursive request from a client that is willing to perform recursion for, it may go through the process of resolving the requested domain name by first asking the root servers, which may respond with a referral to the top level DNS servers, then asking one of those servers, which may respond with a referral to the next level DNS servers, etc. A Recursion Available (RA) field 207 may indicate whether recursive query support is available. A recursive DNS query may be understood to take place when a DNS server may not know the answer of a domain name, so it may have to check with other servers. A 000 field 208 may be reserved for future use and it may need to be zero in all queries and responses. An Response Code (RCODE) field 209 may identify a type of response to a query, such as "no error", "format error", "server failure", "name error", "not implemented", or "refused" among others, based on different errors that may occur in retrieving a response or a retrieval success. The Message Header section 200 may also have "count" fields that may indicate to the recipient server a number of entries in the other four sections of the message. A Question Count (QDCOUNT) field 210 may indicate a number of entries in a Message Question Section 211 of the DNS message, which will be described below. An Answer Record Count (ANCOUNT) field 212 may identify a number of resource records in a Message Answer Section 213 of the DNS message, which will be described below. Resource records may be understood as data elements that may define a structure and content of a domain name space. All DNS operations may be ultimately formulated in terms of resource records. A Name Server Count (NSCOUNT) field 214 may identify a number of name server resource records in a Message Authority Section 215 of the DNS message, which will be described below. An Additional Record Count (NSCOUNT) field 216 may identify a number of resource records in a Message Additional Section 217 of the DNS message, which will be described below.

A second section is the Message Question section 211. The Message Question section 211 may carry one or more "questions", that is, queries for information being sent to a DNS name server. The section may comprise the entries Question Name (QNAME) 218, Question Type (QTYPE) 219 or Question Class (QCLASS) 220. The QNAME 218 may indicate a name being queried. Here a question name may be understood as a domain name represented as a sequence of labels, where each label may comprise a length octet followed by a number of octets. The domain name may terminate with a zero length octet for the null label of the root. Its content may depend upon a type of question (QTYPE), below. For example, a request for an A record may typically require a host part, such as, www.example.com, an MX query may only require a base domain name, such as, example.com. The QTYPE field 219 may indicate the resource records being requested, such as: A record, NS record, CNAME record SOA record, WKS record, PTR record MX record, AAAA record, SRV record, or any (ANY) record, as described earlier. The QCLASS field 220 may specify a class of resource record being requested, e.g. Internet, CHAOS etc. The most common value is IN (Internet).

A third section in the DNS message is the Message Answer section 213. The Message Answer section 213 may carry one or more resource records that may answer the question(s) indicated in the Message Question section 211 described above.

A fourth section is the Message Authority section 215. The Message Authority section 215 may contain one or more resource records that may point to authoritative name servers that may be used to continue the resolution process. An authoritative name server may provide an actual answer to a DNS query. The authoritative name server may provide an original and definitive answer to the DNS query. The resolution process may be understood as a process a domain name may use to resolve to its corresponding IP address.

A fifth section is the Message Additional section 217. The Message Additional section 217 may convey one or more resource records that may contain additional information related to the query that may not be strictly necessary to answer the queries, that is, the questions, in the message.

The Message Answer section 213, the Message Authority section 215, and the Message Additional section 217 may share the same basic format, as depicted in FIG. 2. Each may carry one or more resource records that may use a common record format. The sections may differ only in terms of the types of records they may carry. Answer records may be directly related to the question asked, while Authority records may carry resource records that may identify other name servers. The Additional section may exist for the specific purpose of improving DNS efficiency. There may be cases where a server may supply an answer to a query that it may have reason to believe may lead to a subsequent question that the DNS server may also answer.

In any of the Message Answer section 213, the Message Authority section 215, and the Message Additional section 217, a NAME field 221 may indicate a domain name to which the resource record may pertain. A Type (TYPE) field 222 may specify a meaning of the data in the RESOURCE DATA field 226. A CLASS field 223 may indicate the class of the data in the RESOURCE DATA field 226. A Time to Live (TTL) field 224 may indicate a time interval, in e.g., seconds, that the resource record may be cached before it may need to be discarded. A Resource Data Length field 225 may specify a length in octets of the RESOURCE DATA field 226. The Resource Data field 226 may describe the resource. The format of this information may vary according to the TYPE and CLASS of the resource record. For example, if the TYPE is A and the CLASS is IN, the RDATA field is a 4 octet ARPA Internet address.

When a DNS client initiates a DNS query, that is, when it may initiate sending a DNS message to a DNS server asking for the IP address of a specific domain name, it may create a message with the fields in the Header filled in, and one or more queries, that is, requests for information, in the Question section. The client may set the QR flag 202 to 0 to indicate that this is a query, and may place a number in the Question Count field 210 of the header that may indicate the number of questions in the Message Question section 211. The number of entries in the other sections may usually be zero, so their "count" fields, that is, the Answer Record Count 212, the Name Server Count 214 and the Additional Record Count 216 may be set to 0 in the header. While more than one question may be put into a query, usually only one may be included. Additionally, the DNS server may be responsible for filling in the other three sections of the DNS message: the Message Answer section 213, the Message Authority section 215 and the Message Additional section 217.

Figure 3:
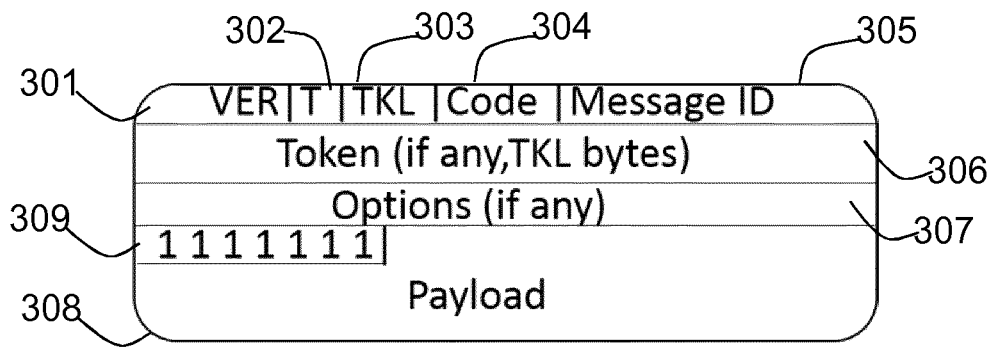
FIG. 3 is a schematic diagram illustrating an example of a CoAP message.

FIG. 3 shows the format of a CoAP message. CoAP messages may be encoded in a simple binary format. As illustrated in FIG. 3, the CoAP message format may start with a fixed-size 4-byte header. The fields in the CoAP header may be as described next. A Version (VER) field 301 may define the CoAP version. A Type (T) field 302 may indicate the type of message, e.g., query or response. A Token length (TKL) field 303 may indicate a length of the variable-length token field. In CoAP, request and response semantics may be carried in CoAP messages, which may include either a Method Code or Response Code. A code (CODE) field 304 may indicate the response code, in case of a response message, or a method code, in case of a request message. Response Codes may relate to a small subset of HTTP status codes with a few CoAP-specific codes added, e.g., 200 OK. Method code may define the method of a request, e.g., GET, PUT, POST, DELETE . . . A messageID field 305 may identify the message.

This may be followed by a variable-length Token (TKL) value field 306, which may be between 0 and 8 bytes long, and which may indicate a length of the variable-length Token field. Following the Token value may come a sequence of zero or more CoAP options in Type-Length-Value (TLV) format. CoAP may define a number of options that may be included in a corresponding option field in a message. Each option field 307 in a message may specify an option Number of the defined CoAP option, a length of the option Value, and the option Value itself. Following the header, token, and options, if any, the message may, optionally, comprise a payload field 308, which may also be referred to simply as the payload 308. If the payload 308 is present and of non-zero length, it may be prefixed by a fixed, one-byte Payload Marker (0xFF) 309, which may indicate the end of the options and the start of the payload. The payload 308 may take up the rest of the datagram. The payload of requests or of responses indicating success may typically be a representation of a resource, which may be referred to as a "resource representation", or the result of the requested action. With UDP, a datagram may be understood as a basic transfer unit structured in header and payload sections. Datagrams may provide a connectionless communication service across a packet-switched network.

As may be appreciated in FIG. 2 and FIG. 3, a DNS message and a CoAP message may have different formats.

Figure 4:
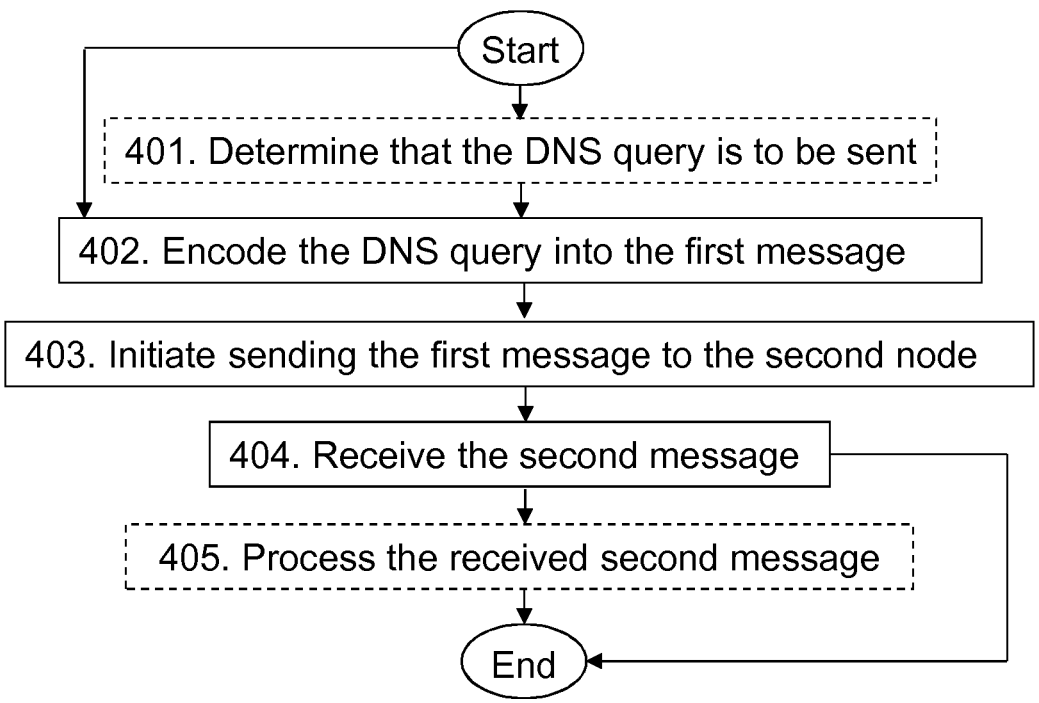
FIG. 4 is a flowchart depicting embodiments of a method in a node, according to embodiments herein.

Embodiments of method performed by the node 111 will now be described with reference to the flowchart depicted in FIG. 4. The method may be understood to be for supporting the Domain Name System (DNS) over the Constrained Application Protocol (CoAP). The node 111 operates in the communications network 100. The node 111 supports operation on CoAP, and the node 111 is incapable of supporting operation on the DNS protocol.

The method may comprise the actions described below. Several embodiments are comprised herein. In some embodiments some of the actions may be performed. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 4, optional actions are indicated with dashed boxes.

Action 401

In the course of operations of the communications network 100, the node 111 may at some point need to contact a particular node to for example, retrieve data for a user, e.g., a webpage content. The node 111 may only have the domain name information of the particular node, e.g., www.ericsson.com. To be able to contact the particular node, the node 111 may need to obtain a translation of the domain name "www.ericsson.com" into an IP address. For that purpose, the node 111 may send a DNS query to the another node 112. This may be, for example, "www.ericsson.com".

Based on the foregoing, in this Action 401, the node 111 may determine that the DNS query is to be sent to the another node 112, which may for example be a DNS server in the cloud 120. The another node 112 supports operation on the CoAP and on the DNS protocol, in contrast to the node 111, which supports the CoAP, but does not support operation on the DNS.

The node 111 may know that the another node 112 supports operation on the CoAP and on the DNS protocol because usually, nodes in the communications network 100 such as the node 111, may have configured a DNS address of the another node 112 automatically via the Dynamic Host Configuration Protocol (DHCP). DHCP may be understood as a network management protocol used on Transmission Control Protocol/Internet Protocol (TCP/IP) networks whereby a DHCP server may assign an IP address and other network configuration parameters to each device on a network so they may communicate with other IP networks.

As may be appreciated by inspecting FIG. 2 and FIG. 3, a DNS message may have a rather different format than a CoAP message, and the node 111 may not be able to handle the format of the DNS message. By making the determination in this Action 401, the node 111 may then realize that the another node 112 may support operation on the DNS protocol, which may be understood to mean that it may need to be input with certain variables, that is, certain values for certain fields in a message format the another node 112 may understand.

Action 402

To be able to exchange messages with the another node 112, since the another node 112 supports operation on the CoAP and on the DNS protocol, in this Action 402, the node 111 encodes the DNS query into a first message. The first message has a format supported by the CoAP, wherein the DNS query is mapped to the CoAP format of the first message based on a mapping scheme. By performing this Action 402, the node 111 may still handle the DNS query using a more simplified CoAP, and the another node 112, may be enabled to still receive and process the DNS query. The first message may be, e.g., a CoAP DNS request.

The mapping scheme may be understood to comprise a set of correspondences of how a particular type of information, in this case, DNS information, may be systematically placed, and later found, in a section of a message so that it may be correctly processed by the another node 112. A particular non-limiting example of the mapping scheme is described next, detailing how the information comprised in a DNS message is encoded in the first message, having the format supported by the CoAP. The format supported by the CoAP may also be referred to herein as the CoAP format.

Header Section

The DNS header may be mapped in the first message, that is, a CoAP message. The fields in the CoAP header may be understood to correspond to those described earlier, namely Version (VER), Type (T), Token length (TKL), Code, and MessageID.

Table 1 in FIG. 10 describes in the first column from the left, every option of the header section in a DNS message according to existing methods, and its corresponding meaning, that is, its function, in the middle column. The column to the farthest right, shows a non-limiting example of the mapping scheme in the first message, e.g., a CoAP message for the header section, according to embodiments herein. The non-limiting example of the mapping scheme is indicated in Table 1 as "CoAP Mapping".

*Note that the name and the particular name and/or number of the new options and values, as shown in Table 1 are non-limiting examples, as other names or numbers may be chosen to perform an equivalent function.

As shown in Table 1, the first message may not need to comprise information corresponding to the following fields in a DNS message: Message ID, QR, TC, and the count fields QDCOUNT, ANCOUNT, NSCOUNT, and ARCOUNT.

In the first message, information corresponding to the OPCODE field in DNS may be found in the options field.

The information in the AA, RD and RA fields may be mapped to respective new options values. The response type (RCODE) may be mapped to the already defined CoAP Response codes.

Question Section

In CoAP, the queries from the node 111 may be defined in the Uniform Resource Identifier (URI)-query option. The URI-query option in the first message may be considered to correspond to the option field 307 in CoAP. That may simplify the first message, that is the DNS query message using CoAP. As FIG. 2 shows, the DNS question query may have a few fields. Table 2 in FIG. 11 shows how those fields may be mapped in CoAP to the first message, according to a non-limiting example of the mapping scheme for the Question section. Table 2 describes in the first column from the left, every option of the question section in a DNS message according to existing methods, and its corresponding meaning, that is, its function, in the middle column. The column to the farthest right shows the non-limiting example of the mapping scheme in the first message, for the question section, according to embodiments herein. The non-limiting example of the mapping scheme is indicated in Table 2 as "CoAP Mapping". Note that the name and the number of the new values in Table 2 are irrelevant.

The answer, authority and additional sections may be encoded in CoAP in the payload field.

The Class field 223 may not need to be represented in CoAP since it may always be of type "Internet" in IoT scenarios.

The node 111 may encode the DNS query into the first message in this Action 402 using, for example, the CoAP GET or POST methods.

Considering the foregoing, in some embodiments, according to the mapping scheme, the first message may comprise, in one or more first option fields, at least one of: a) an operation type of the DNS query in a first value; e.g., the OPCODE may be mapped to the options field of the CoAP message format; b) a Recursion Desired indicator of the DNS query in a second value, e.g., the RD may be mapped to the second value; c) a name queried by the DNS query in a name option; e.g., the QNAME may be mapped to the name option in CoAP, and d) a type of resource records requested by the DNS query in a type option, e.g., the QTYPE may be mapped to the type option in CoAP. If the Recursion Desired indicator field is set, it may direct the another node 112 to pursue the DNS query recursively. Recursive query support may be optional.

In some of these embodiments, according to the mapping scheme, at least one of: a) the operation type of the DNS query may be mapped to a URI-path option, b) the name queried may be a domain name and it may be mapped to a URI-query option, and c) the type of resource records requested by the DNS query may be mapped to another URI-query option. Any of the values referred to in the first message may be comprised in a particular field. Particular examples of the mapping scheme will be shown later, in relation to FIG. 6*b* and FIG. 7*b*, and examples of the fields will be provided.

In some embodiments, the encoding in this Action 402 may be based on the determination performed in Action 401. That is, the encoding in this Action 402 may only be performed when the node 111 may have determined that the DNS query is to be sent to the another node 112, but not otherwise, when e.g., the node 111 may communicate with e.g., another constrained device, over CoAP.

Action 403

In this Action 403, the node 111 initiates sending the first message to the another node 112. The another node 112 operates in the communications network 100, and, as stated earlier, the another node 112 supports operation on the CoAP and on the DNS protocol.

To initiate sending may be understood as to begin sending itself or to, trigger the sending by a different node, e.g., in a distributed node environment. The sending may be performed over e.g., the link 151.

In some embodiments, the first message may be sent using Datagram Transport Layer Security (DTLS), thereby taking advantage of the enhanced security features offered by CoAP. Datagram Transport Layer Security (DTLS) may be understood as a communications protocol that may provide security for datagram-based applications by allowing them to communicate in a way that is designed to prevent eavesdropping, tampering, or message forgery. The DTLS protocol may be understood to be based on the stream-oriented Transport Layer Security (TLS) protocol and is intended to provide similar security guarantees.

Action 404

In this Action 404, the node 111 receives a second message from the another node 112. The second message has the format supported by the CoAP. The second message comprises a DNS response to the sent DNS query. The second message may be, e.g., a Server DNS Response. It may be understood that within a particular system, e.g., the CoAP, having the same format may not necessarily mean having a same number of fields or values. For example, the first message and the second message, while having the same format, CoAP format, may have different fields, since the information that the first message and the second message may use may be different. For example, the first message may not use the recursion available option but the second message may use it.

The DNS response is mapped to the CoAP format of the second message based on the mapping scheme described in Action 402. However, it may be possible that second message has a different mapping scheme than that describe in Action 402, but still being in a format supported by the CoAP. In any event, it may be understood that both of the node 111 and the another node 112 may be informed about what the mapping scheme may be, so they may process the first message and second message appropriately. This may be achieved e.g., by pre-configuration, or by a configuration of the node 111 by the another node 112. The receiving may be performed over e.g., the link 151.

Considering the foregoing, in some embodiments, according to the mapping scheme, the second message may comprise at least one of: a) in one or more second option fields, a Recursion Available indicator, e.g., RD, of the DNS response in a third value, and b) in a payload field, at least one of: i) an additional section of the DNS response, and ii) an Authoritative Answer indicator, e.g., AA, of the DNS response in a fourth value, and c) a DNS response type indicated by a CoAP response code in a header of the second message. As stated earlier, particular examples of the mapping scheme will be shown later, in relation to FIG. 6*b* and FIG. 7*b*.

Action 405

The node 111 may then, in this Action 405, process the received second message based on the mapping scheme, and thereby extract DNS data from the second message. The DNS data may be, for example the IP address corresponding to "www.ericsson.com".

In some embodiments, the first message may be sent and the second message may be received using DTLS security.

Figure 5:
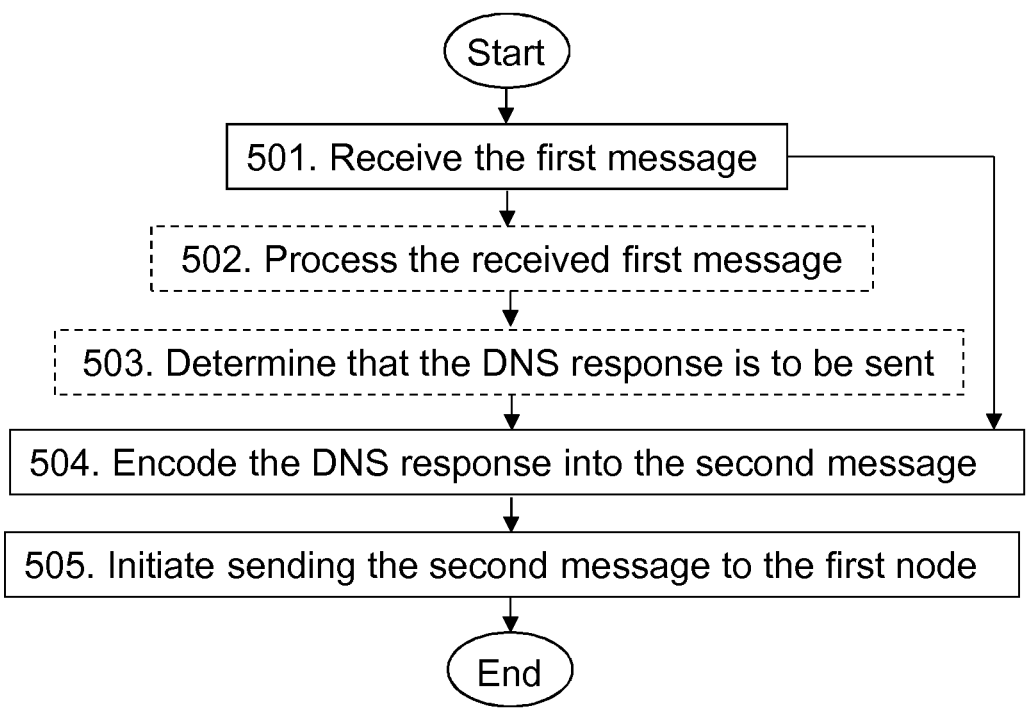
FIG. 5 is a flowchart depicting embodiments of a method in another node, according to embodiments herein.

Embodiments of a method performed by the another node 112, will now be described with reference to the flowchart depicted in FIG. 5. The method may be understood to be for supporting the Domain Name System (DNS) over the Constrained Application Protocol (CoAP). The another node 112 operates in the communications network 100, wherein the another node 112 supports operation on the CoAP and operation on the DNS protocol.

The method may comprise one or more of the following actions. Several embodiments are comprised herein. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 5, optional actions are indicated with dashed boxes.

The detailed description of some of the following corresponds to the same references provided above, in relation to the actions described for the node 111, and will thus not be repeated here to simplify the description. For example, the node 111 may be a constrained node.

Action 501

In this Action 501, the another node 112 receives the first message from the node 111. As stated earlier, the node 111 operates in the communications network 100 and the node 111 supports operation on the CoAP. The node 111 is incapable of supporting operation on the DNS protocol. The received first message comprises the DNS query.

The received first message has the format supported by the CoAP, wherein the DNS query is mapped to the CoAP format of the first message based on the mapping scheme, as described earlier.

The receiving may be performed, e.g., via the link 151.

Action 502

When the another node 112 may receive the first message, it may process it and perform the information retrieval operation requested, if it may.

In this Action 502, the another node 112 may process the received first message based on the mapping scheme, and thereby extract the DNS data from the first message. Here, the DNS data may be for example, "www.ericsson.com". The DNS data extracted by the first node 111 in Action 405 and the DNS data extracted by the another node 112 in this Action 502 may be understood to be different. The DNS data extracted by the first node 111 in Action 405 may be understood to be a first type of DNS data and the DNS data extracted by the another node 112 in this Action 502 may be understood to be a second type of DNS data.

As described earlier, according to the mapping scheme, the first message may comprise, in the one or more first option fields, at least one of: a) the operation type of the DNS query in the first value, b) the Recursion Desired indicator of the DNS query in the second value, c) the name queried by the DNS query in the name option, and d) the type of resource records requested by the DNS query in the type option. In some particular embodiments, according to the mapping scheme, at least one of: a) the operation type of the DNS query may be mapped to the URI-path option, b) the name queried may be the domain name and may be mapped to the URI-query option, and c) the type of resource records requested by the DNS query the mapped to the another URI-query option.

Action 503

The another node 112 may then, in this Action 503, determine, based on the processing performed in Action 502, that the received first message comprises the DNS query, and that the DNS response is to be sent to the node 111 with the format supported by the CoAP. The determination in this Action 503 may be based on reading the code field, which, as stated earlier, may indicate the method code, and the options field comprised in the received first message.

Action 504

In this Action 504, the another node 112 encodes the DNS response to the received DNS query into the second message. The second message has the format supported by the CoAP. The DNS response is mapped to the CoAP format of the second message based on the mapping scheme.

As mentioned earlier, additional fields may be represented in CoAP in the payload field. The payload file may indicate every section with an AN, Name Server Records (NS), and AR respectively. The information may be mapped in the CoAP payload as:

NAME TTL TYPE RDATA

For instance:

example.com 59 A 20.21.22.23

As described earlier, according to the mapping scheme, the second message may comprise at least one of: a) in the one or more second option fields: the Recursion Available indicator of the DNS response in the third value, b) in the payload field, at least one of: i) the additional section of the DNS response, and ii) the Authoritative Answer indicator of the DNS response in the fourth value, and c) the DNS response type indicated by the CoAP response code in the header of the second message.

In some embodiments, the encoding in this Action 504 may be based on the determination performed in Action 503. That is, the encoding in this Action 504 may only be performed after the another node 112 determines that the recipient of the second message is going to be incapable of supporting operation on the DNS protocol, and therefore unable to process a DNS response.

To perform this Action 504, the another node 112 may use the query extracted from the first message as the basis for the second message.

Action 505

In this Action 505, the another node 112 initiates sending the second message to the node 111.

To initiate sending may be understood as to begin sending itself or to, trigger the sending by a different node, e.g., in a distributed node environment. The sending may be performed over e.g., the link 151.

In some embodiments, the first message may be received and the second message may be sent using DTLS security.

The methods just described as being implemented by the node 111 and the another node 112 will now be described in further detail next, in relation to FIG. 6, panels a and b, and FIG. 7, panels a and b, with particular non-limiting examples.

Figure 6A:
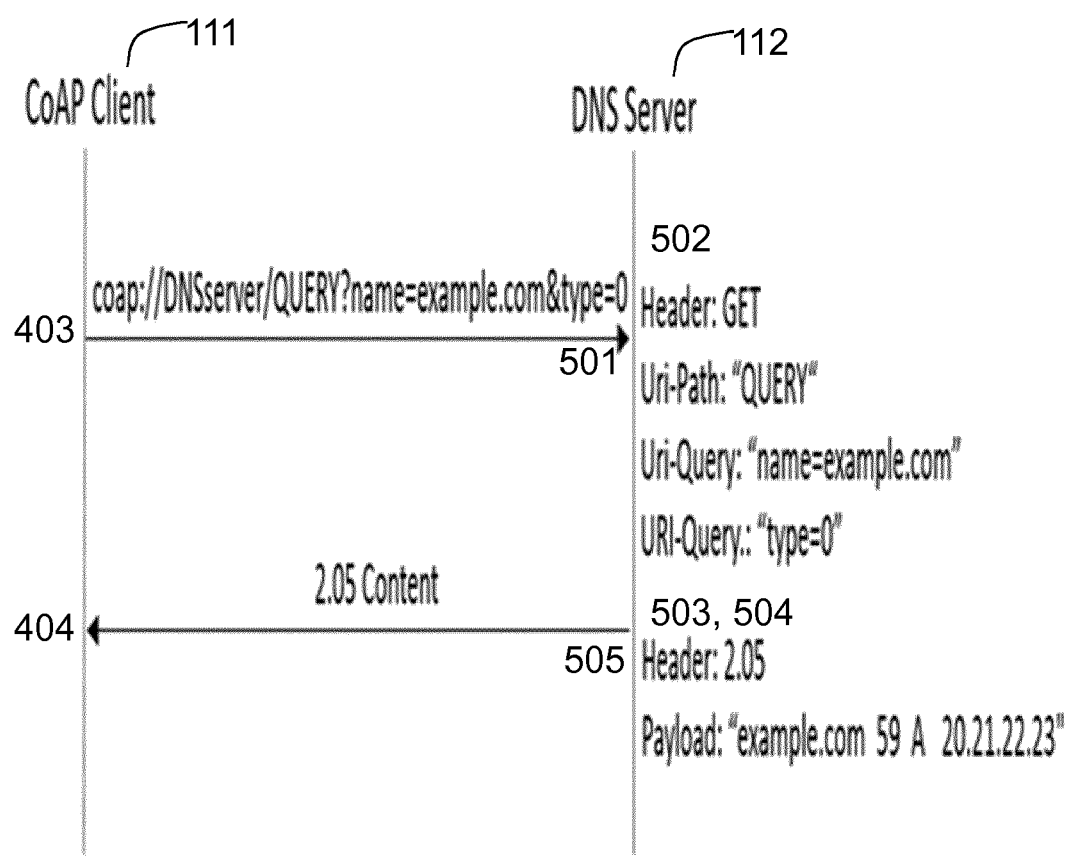
FIG. 6 shows, in panel a, a schematic diagram illustrating an example of methods in a node and in another node, and in panel b, a schematic diagram illustrating an example of a first message and a schematic diagram illustrating an example of a second message, according to embodiments herein.

FIG. 6a is a schematic representation illustrating a non-limiting example of the node 111, the "CoAP client" in the FIG. 6a, requesting an IPv4 address of the domain name "example.com" to the another node 112, the "DNS server" in the FIG. 6a. using CoAP. The non-limiting example in FIG. 6a shows how the node 111 sends, according to Action 403, the first message 601, which depicted in FIG. 6b as a "CoAP DNS Request". The first message 601 comprises, in this example, a Confirmable GET query requesting the IPv4 address (type=0) of example.com (name=example.com). The node 111 sends the following first message 601 "coap://DNSserver/QUERY?name=example.com&type=0" to the another node 112. The format of the first message 601 comprises the following fields. The format starts with a fixed-size 4-byte header 602. The fields in the header 602 are: the Version (VER) field 603 defines the CoAP version as version "1". The Type (T) field 604 indicates the first message is a query with a "0" value. The Token length (TKL) field 605 indicates the length of the variable-length token field is 0 since in this example, there is no token define in the first message 601. The code (CODE) field 606 indicates the response code the request method is "GET=1". The messageID (MID) field 607 identifies the message with a Message ID of 0x7d34.

Figure 6B:
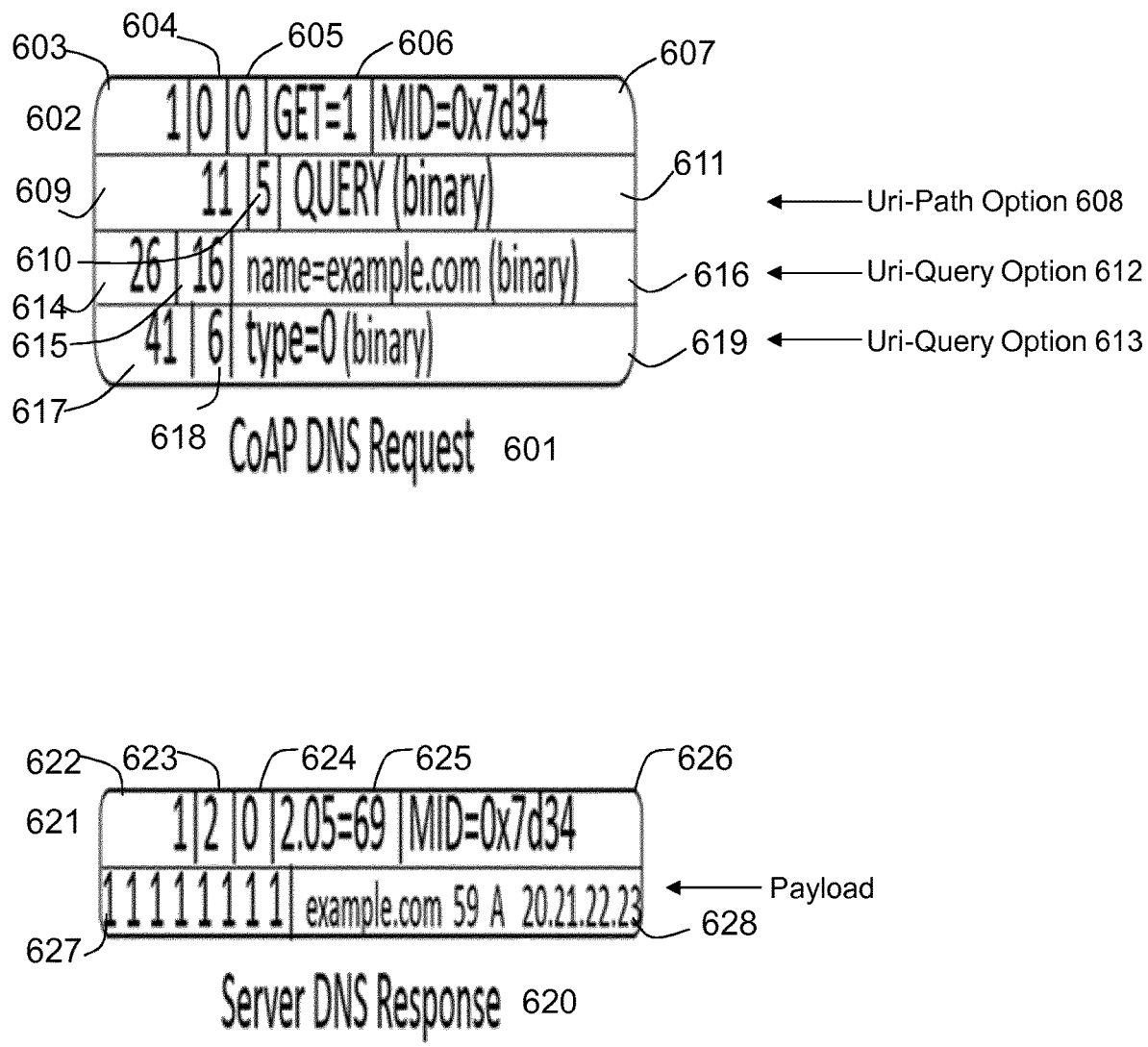

The first message 601 comprises, in this example, several "options". An option may be understood as comprising a group of fields. As briefly noted earlier, each option may comprise the following fields: a) an option Delta field, b) a Length field and c) an option value field. The option Delta field may be understood to indicate a difference between an option Number of this option and that of a previous option, which may be understood to be zero for the first option. In other words, the option Number may be understood to be calculated by adding up the option Delta values of a current option and all previous options before it. And option number may be understood as an identifier of a specific option. For example, "If-Match" has identifier 1, "URI-Host" has identifier 3, "ETag" has identifier 4,"If-None-Match" has identifier 5, "URI-Port" has identifier 7, "URI-Path" has identifier 11, etc. The Length field may be understood to indicate a length of the option Value. The option value field may be understood to comprise the option Value itself. In the example of FIG. 6b, the header 602 comprises a first option which is a URI-Path option, and which is referred to herein as a first URI-Path option 608. A first sub-field 609 corresponds to the option Number field of the first URI-path option 608 and indicates a value corresponding to the delta calculated as the previous delta and the option Number. Since this is the first option, the delta of this option is: Delta 0+11=11. A second sub-field 610 corresponds to the Length field of the first URI-Path option 608 and indicates a length of the option Value of the first URI-path option 608 being 5 bytes. The first URI-Path option 608 comprises a third sub-field 611 corresponding to the option Value field of the first URI-Path option 608, which in this example indicates a value "QUERY", which is 5 bytes long. It may be understood that the term sub-field, is used herein to denote a field comprised in an option.

The Token is left empty in this example of the first message. Additionally the header 602 comprises a second option which is a URI-Query option, and which is referred to herein as a second URI-Query option 612 and third option which is a URI-Query option, and which is referred to herein as a third URI-Query option 613. A fourth sub-field 614 corresponds to the option Delta field of the second URI-Query option 612 and indicates that it is 26. The delta of the second URI-Query option 612 is calculated as the previous delta indicated in the first sub-field 609, which is 11, plus the option Number of the second URI-Query option 612, which is 15. Then, the delta of the second URI-Query option 612 is 11+15=26. A fifth sub-field 615 corresponds to the Length field of the second URI-Query option 612 and indicates the length of the second URI-Query option 612 is 16. The sixth sub-field 616 corresponds to the option Value field of the second URI-Query option 612, which in this example indicates the domain name being queried in this example, with a value of "name=example.com (binary)". A seventh sub-field 617 corresponds to the option Delta field of the third URI-Query option 613, which in this example indicates indicates the option Delta field of the third URI-Query option 613 is 41. The delta of the third URI-Query option 613 is calculated as the delta of the second option, which is 26, plus the option number of the third URI-Query option 613, which is 15:26+15=41. An eighth sub-field 618 corresponds to the Length field of the third URI-Query option 613, which in this example indicates a length of the third URI-Query option 613 is 6. A ninth sub-field 619 corresponds to the option Value field of the third URI-Query option 613, which in this example indicates the type of request with a value of "type=0".

The another node 112 receives the first message according to Action 501, and according to Action 502 processes the first message 601 based on the mapping scheme, and extracts the DNS data, as schematically indicated in FIG. 6a. As we stated before, the message 601 has three URI-Path options. The first URI-Path option 608 indicates that the first message is a "QUERY", the second URI-Query option 612 indicates the domain name "example.com" with a value of "name=example.com (binary)", and the third URI-Query option 613 indicates the type of the DNS query "type=0" with a value of "type=0 (binary)".

According to Action 503, the another node 112 determines that a DNS response is to be sent to the node 111 with the format supported by the CoAP. According to Action 504, the another node 112 encodes the DNS response to the received DNS query into the second message 620. The second message 620 is here a Server DNS Response. The format of the second message 620 comprises the following fields. The format starts with the fixed-size 4-byte header 621. The fields in the header 621 are: the Version (VER) field 622 defines the CoAP version as version "1". The Type (T) field 623 indicates the second message is a response with a "2" value. The Token length (TKL) field 624 indicates the length of the variable-length token field is 0, as the first message does not comprise any token. The code (CODE) field 625 indicates a 2.05 (Content) response. The messageID field 626 echoes the Message ID 0x7d34 of the first message 601. The empty Token value is also echoed in the second response 620. The 1111111 field 627 is comprised in the second message 620. The 1111111 field 627 is used to differentiate between the header and the payload field 628. In this example, the payload field 628 comprises the payload "example.com 59 A 20.21.22.23". Note that not all the messages need to comprise the payload field 628. For example, the first message 601 in this example does not need any payload. The second message 620 comprises the payload field 620 though and that's the reason 1111111 field is there too.

According to Action 505, the another node 112 then sends the second message 620 to the node 111, and the node 111 receives it according to Action 404.

Figure 7A:
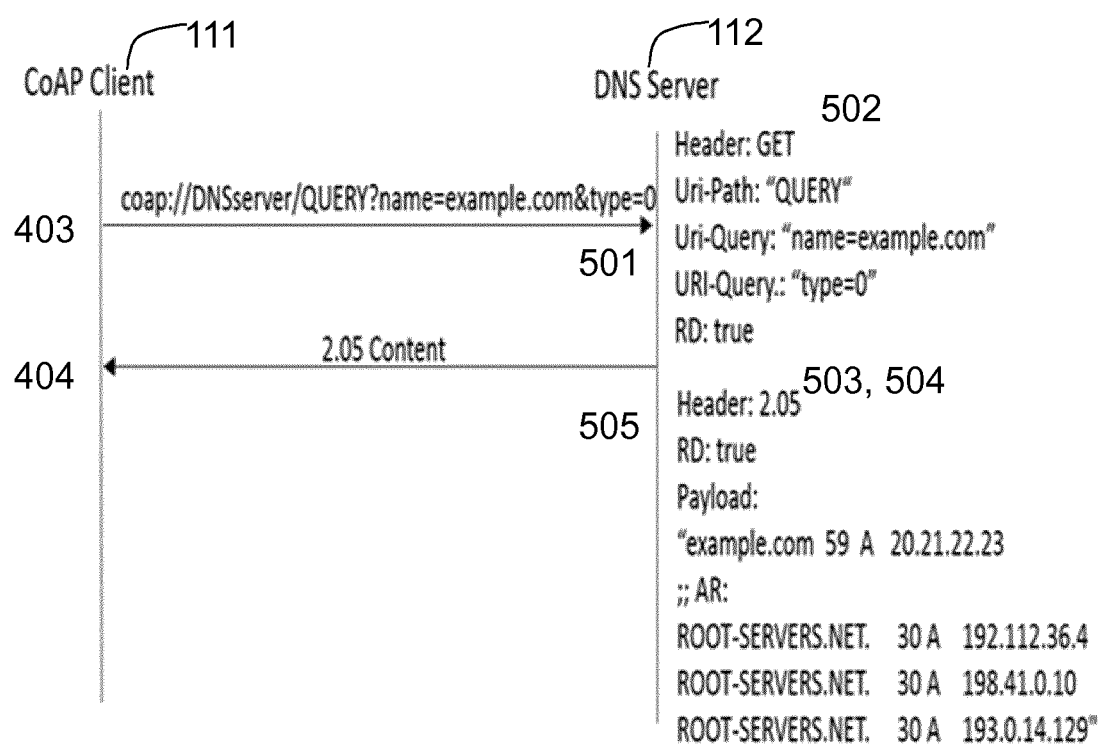
FIG. 7 shows, in panel a, a schematic diagram illustrating another example of methods in a node and in another node, and in panel b, a schematic diagram illustrating another example of a first message and a schematic diagram illustrating another example of a second message, according to embodiments herein.
Figure 7B:
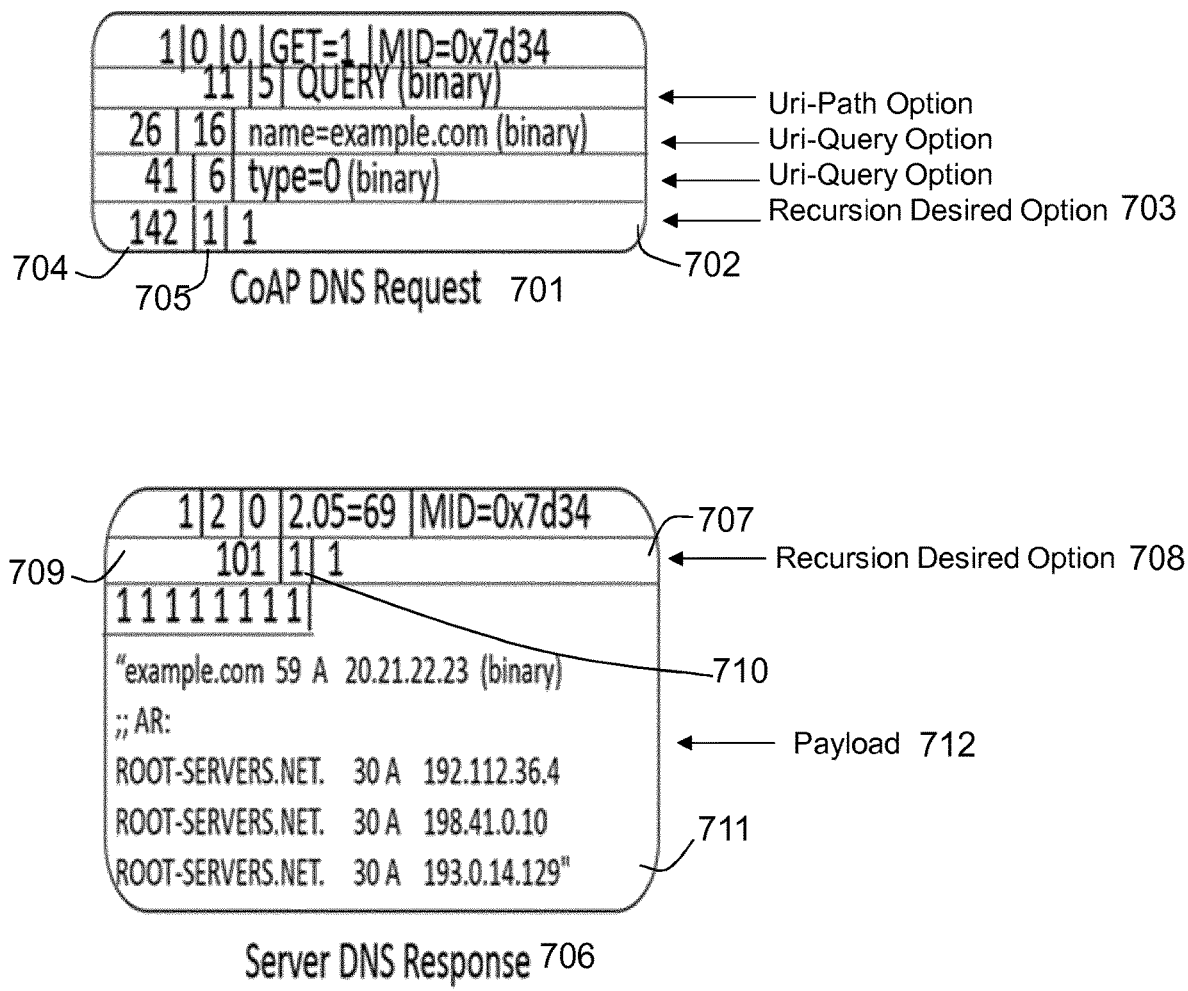

FIG. 7a is a schematic representation illustrating another non-limiting example of the node 111, the "CoAP client" in the FIG. 7a, requesting an IPv4 address of the domain name "example.com" to the another node 112, the "DNS server" in the FIG. 7a, using CoAP. The example in FIG. 7b is similar to the example in FIG. 6b, and the fields in this example having the same description of that of FIG. 6b will not be repeated to simplify the description. The node 111 sends, according to Action 403, a similar first message 701, a Confirmable GET request message, to the another node 112. However, in this case, the node 111 requests that the another node 112 performs recursion by setting an RD (Recursion Desired) flag in a tenth sub-field 702 comprised in a further option field of the first message 701, a fourth option field, which is a RD option field, and which is referred to herein as a fourth Recursion Desired option 703. The 702, 703 and 704 fields describe the recursion desire option. An eleventh sub-field 704 corresponds to the option Delta field of the fourth Recursion Desired option 703 and it the option Delta field 704 option is "142". The delta option is calculated as the delta number of the previous option, which is 41, plus the option number of fourth Recursion Desired option 703, which is 101. Then, the delta value of the fourth Recursion Desired option 703 is 41+101=142.

A twelfth sub-field 705 corresponds to the Length field of the fourth Recursion Desired option 703 and indicates the option Length of the fourth Recursion Desired option 703 is 1.

The another node 112, according to Action 501 receives the first message 701, processes it according to Action 502, and extracts the DNS data, as described before. In this example, the another node 112 also extracts that the RD flag, which indicates "True". According to Action 503, the another node 112 determines that a DNS response is to be sent to the node 111 with the format supported by the CoAP. According to Action 504, the another node 112 encodes the DNS response to the received DNS query into the second message 706. The another node 112, since it supports recursion, copies the RD flag in the second message 706, specifically 706 into a thirteenth sub-field 707, comprised in another option, which is an RD option, and is referred to herein as fifth Recursion Desired indicator option 708. The second message 705. A fourteenth sub-field 709 corresponds to the option Delta field of the fifth Recursion Desired option 708. The delta option is calculated as the previous delta value of the previous option, which is 0 in this case since is the first option of the message, plus the option number of the fifth Recursion Desired option 708, which is 101 for the 'recursion Desired' option. Then, the delta option value is 0+101=101option A fifteenth sub-field 710 corresponds to the Length field of the fifth Recursion Desired option 708 and indicates the option Length of the option Value of the fifth Recursion Desired option 708 is 1 byte, since in this case, the value of RD is "1", meaning it is "true". The another node 112 returns the IPv4 address and a set of root servers in the Additional Section 711 defined in a payload field 712 in the second message 706 as an "AR:". According to Action 505, the another node 112 then sends the second message 706 to the node 111, and the node 111 receives it according to Action 404, getting an answer, with the additional section 711 in the payload field 712, and the RD flag in the thirteenth sub-field 707 set as true.

As a general summarized overview, embodiments herein may be understood to provide a novel method to encode DNS queries and responses in CoAP messages. Embodiments herein enable to map all the DNS fields into the CoAP header, options fields and payload. In addition, the embodiments herein define a set of new options values, that is, RA,RD,AA, that help to map the DNS messages into the CoAP messages.

One advantage of embodiments herein is that they provide end to end DNS connectivity in IoT scenarios where native DNS is not supported. A further advantage of embodiments herein is that the integration of the DNS system with CoAP provides a transport suitable for IoT devices, such as constrained devices, seeking access to the DNS, since embodiments herein enable to reduce processing resources, e.g., CPU and memory, as well as and energy resources which may need to be used by the constrained devices to send DNS information in a transport protocol. Yet another advantage of embodiments herein is that they provide integrity and confidentiality using the DTLS secure transports with CoAP.

Figure 8:
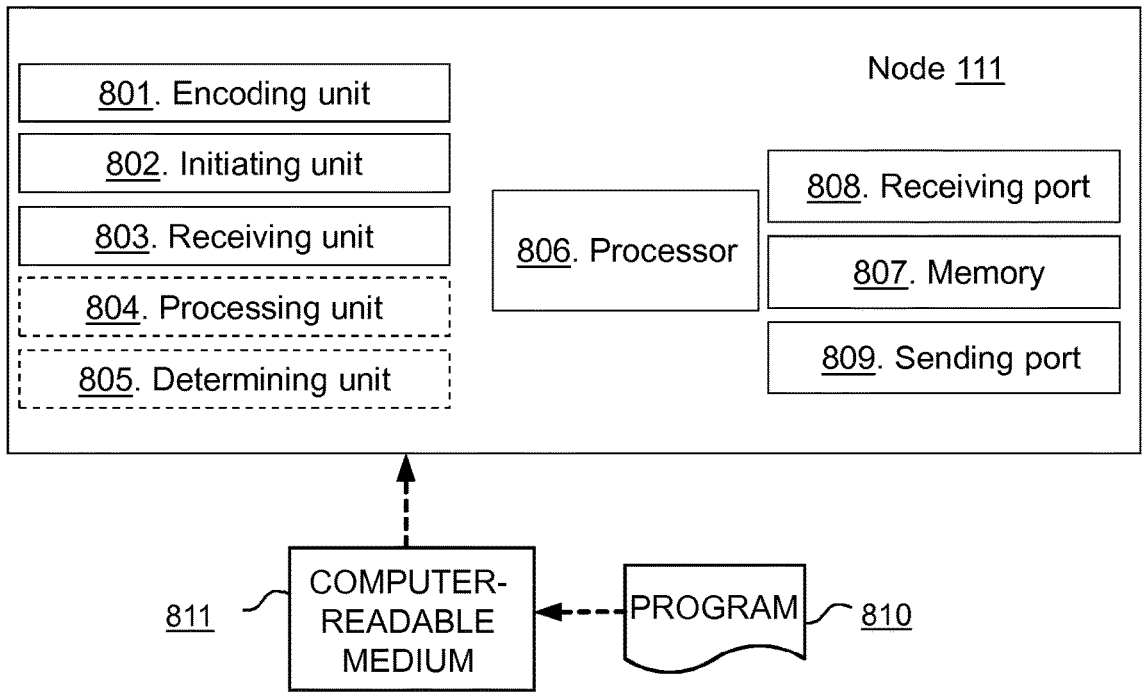
FIG. 8 is a schematic block diagram illustrating two non-limiting examples, a) and b), of a node, according to embodiments herein.
Figure 8:
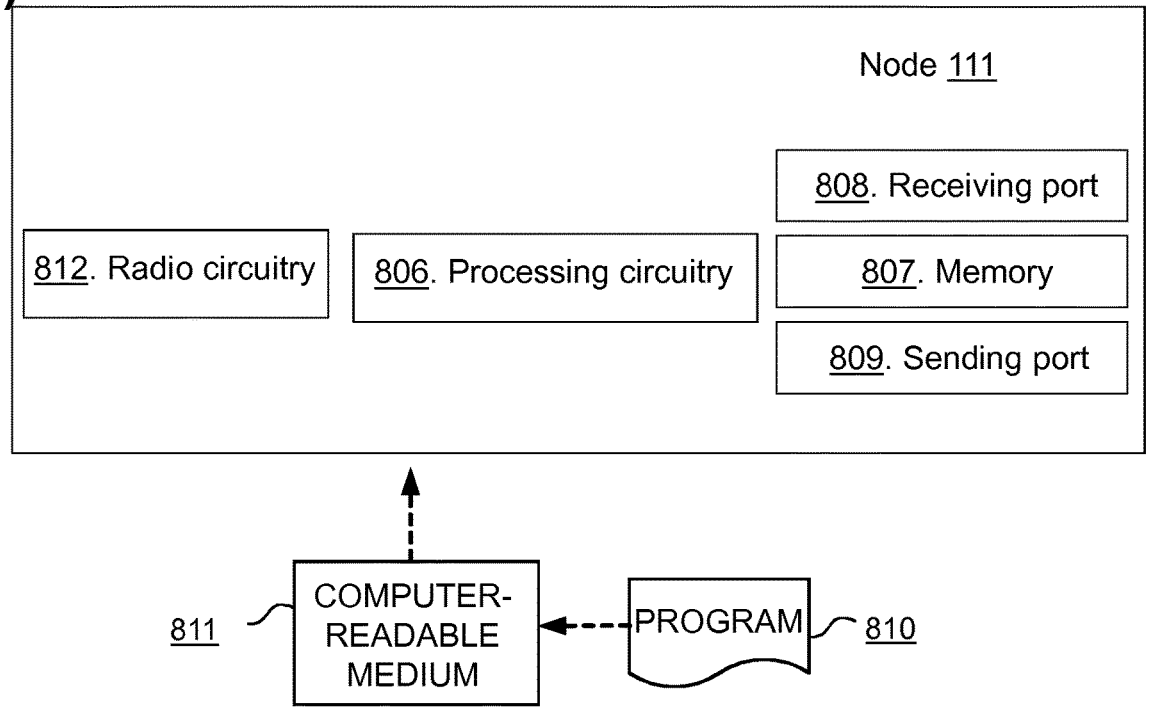

To perform the method actions described above in relation to FIG. 4, the node 111 may comprise the following arrangement depicted in FIG. 8. The node 111 is configured to operate in the communications network 100. The node 111 is further configured to support operation on the CoAP. The node 111 is configured to be incapable of supporting operation on the DNS protocol.

The detailed description of some of the following corresponds to the same references provided above, in relation to the actions described for the node 111, and will thus not be repeated here. For example, the node 111 may be a constrained node.

The node 111 is configured to, e.g. by means of an encoding unit 801 within the node 111 configured to, encode the DNS query into the first message 601, 701, the first message 601, 701 being configured to have the format configured to be supported by the CoAP. The DNS query is configured to be mapped to the CoAP format of the first message 601, 701 based on the mapping scheme.

As described earlier, according to the mapping scheme, the first message 601, 701 may be configured to comprise, in the one or more first option fields 608, 612, 613, 703, at least one of: a) the operation type of the DNS query in the first value, b) the Recursion Desired indicator of the DNS query in the second value, c) the name queried by the DNS query in the name option, and d) the type of resource records configured to be requested by the DNS query in the type option.

In some particular embodiments, according to the mapping scheme, at least one of: a) the operation type of the DNS query may be configured to be mapped to the URI-path option 608, b) the name queried may be configured to be the domain name and may be configured to mapped to the URI-query option 612, and c) the type of resource records configured to be requested by the DNS may be configured to be mapped to the another URI-query option 613.

The node 111 is also configured to, e.g. by means of an initiating unit 802 within the node 111 configured to, initiate sending the first message 601, 701 to the another node 112 configured to operate in the communications network 100. The another node 112 is further configured to support operation on the CoAP and on the DNS protocol.

In some embodiments, the node 111 is further configured to, e.g. by means of a receiving unit 803 within the node 111 configured to, receive the second message 620, 706 from the another node 112. The second message 620, 706 is configured to have the format configured to be supported by the CoAP. The second message 620, 706 is further configured to comprise the DNS response to the DNS query configured to be sent. The DNS response is configured to be mapped to the CoAP format of the second message 620, 706 based on the mapping scheme.

In some embodiments, the node 111 may be configured to, e.g. by means of a processing unit 804 within the node 111 configured to, process the second message 620, 706 configured to be received based on the mapping scheme, and thereby extract DNS data from the second message 620, 706.

In some embodiments, the first message 601, 701 may be configured to be sent and the second message 620, 706 may be configured to be received using DTLS security.

In some embodiments, according to the mapping scheme, the second message 620, 706 may be configured to comprise at least one of: a) in the one or more second option fields 708, the Recursion Available indicator of the DNS response in the third value, b) in the payload field 712, at least one of: i) the additional section 711 of the DNS response, and ii) the Authoritative Answer indicator of the DNS response in the fourth value, and c) the DNS response type configured to be indicated by the CoAP response code in the header 621 of the second message 620, 706.

In some embodiments, the node 111 may be further configured to, e.g. by means of a determining unit 805 within the node 111 configured to, determine that the DNS query is to be sent to the another node 112, wherein to encode may be configured to be based on the determination.

The embodiments herein may be implemented through one or more processors, such as a processor 806 in the node 111 depicted in FIG. 8, together with computer program code for performing the functions and actions of the embodiments herein. The processor 806 may be understood herein to be a hardware component. The program code mentioned above may also be provided as a computer program product, for instance in the form of a data carrier carrying computer program code for performing the embodiments herein when being loaded into the in the node 111. It is however feasible with other data carriers such as a memory stick. The computer program code may furthermore be provided as pure program code on a server and downloaded to the node 111.

The node 111 may further comprise a memory 807 comprising one or more memory units. The memory 807 is arranged to be used to store obtained information, store data, configurations, schedulings, and applications etc. to perform the methods herein when being executed in the node 111.

In some embodiments, the node 111 may receive information from, e.g., the another node 112, through a receiving port 808. In some examples, the receiving port 808 may be, for example, connected to one or more antennas in node 111. In other embodiments, the node 111 may receive information from another structure in the communications network 100 through the receiving port 808. Since the receiving port 808 may be in communication with the processor 806, the receiving port 808 may then send the received information to the processor 806. The receiving port 808 may also be configured to receive other information.

The processor 806 in the node 111 may be further configured to transmit or send information to e.g., the another node 112, through a sending port 809, which may be in communication with the processor 806, and the memory 807.

Any of the encoding unit 801, the initiating unit 802, the receiving unit 803, the processing unit 804 and the determining unit 805 may be the processor 806 of the node 111, or an application running on such processor.

Those skilled in the art will also appreciate that the encoding unit 801, the initiating unit 802, the receiving unit 803, the processing unit 804 and the determining unit 805 described above may refer to a combination of analog and digital circuits, and/or one or more processors configured with software and/or firmware, e.g., stored in memory, that, when executed by the one or more processors such as the processor 806, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the node 111 may be respectively implemented by means of a computer program 810 product, comprising instructions, i.e., software code portions, which, when executed on at least one processor 806, cause the at least one processor 806 to carry out the actions described herein, as performed by the node 111. The computer program 810 product may be stored on a computer-readable storage medium 811. The computer-readable storage medium 811, having stored thereon the computer program 810, may comprise instructions which, when executed on at least one processor 806, cause the at least one processor 806 to carry out the actions described herein, as performed by the node 111. In some embodiments, the computer-readable storage medium 811 may be a non-transitory computer-readable storage medium, such as memory stick, or stored in the cloud space. In other embodiments, the computer program 810 product may be stored on a carrier containing the computer program, wherein the carrier is one of an electronic signal, optical signal, radio signal, or the computer-readable storage medium 811, as described above.

The node 111 may comprise an interface unit to facilitate communications between the node 111 and other nodes or devices, e.g., the another node 112. In some particular examples, the interface may, for example, include a transceiver configured to transmit and receive radio signals over an air interface in accordance with a suitable standard.

Figure 9:
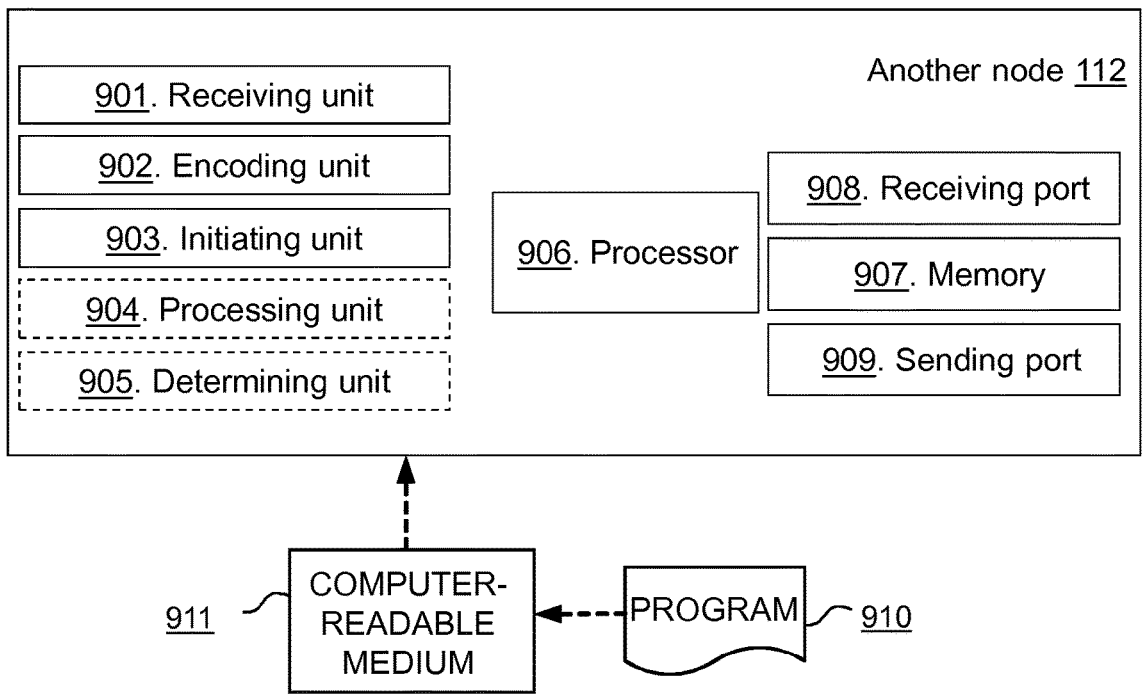
FIG. 9 is a schematic block diagram illustrating two non-limiting examples, a) and b), of another node, according to embodiments herein.
Figure 9:
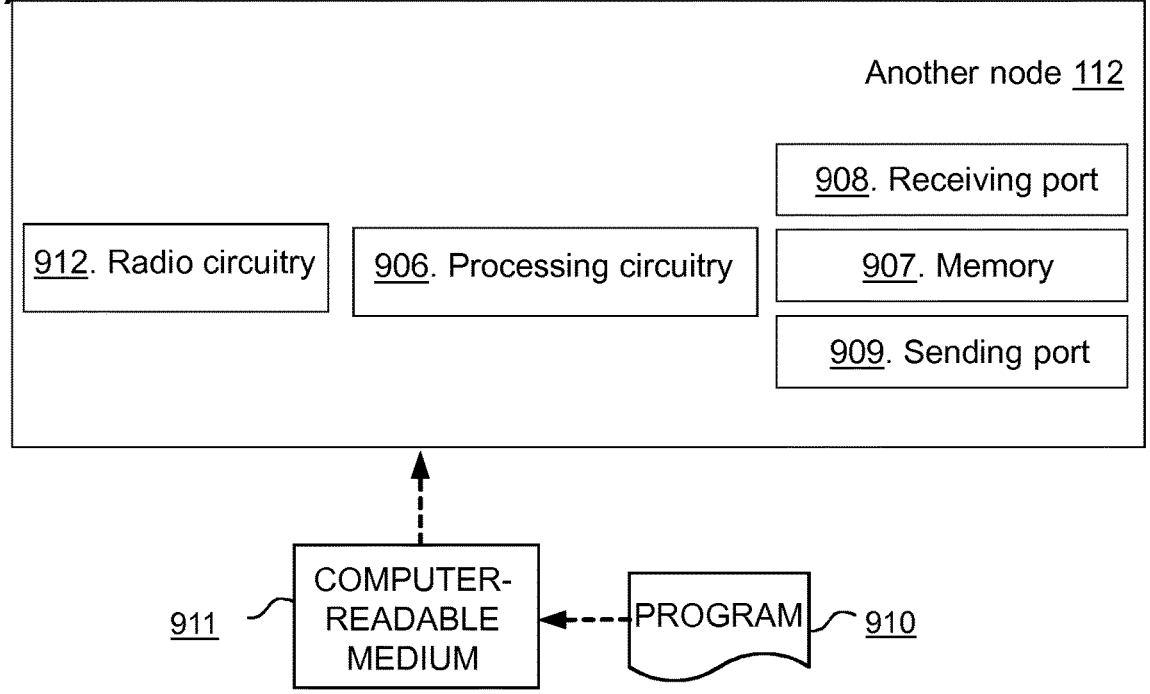

To perform the method actions described above in relation to FIG. 5, the another node 112 may comprise the following arrangement depicted in FIG. 9. The another node 112 is configured to operate in the communications network 100. The another node 112 is configured to support operation on the CoAP and operation on the DNS protocol.

The detailed description of some of the following corresponds to the same references provided above, in relation to the actions described for the another node 112, and will thus not be repeated here. For example, the node 111 may be a constrained node.

The another node 112 is configured to, e.g. by means of a receiving unit 901 within the another node 112 configured to, receive the first message 601, 701 from the node 111 configured to operate in the communications network 100. The node 111 is further configured to support operation on the CoAP. The node 111 is further configured to be incapable of supporting operation on the DNS protocol. The first message 601, 701 configured to be received being is configured to comprise the DNS query. The first message 601, 701 configured to be received is further configured to have the format configured to be supported by the CoAP. The DNS query is configured to be mapped to the CoAP format of the first message 601, 701 based on the mapping scheme.

The another node 112 is also configured to, e.g. by means of an encoding unit 902 within the another node 112 configured to, encode the DNS response to the DNS query configured to be received into the second message 620, 706. The second message 620, 706 is configured to have the format configured to be supported by the CoAP. The DNS response is configured to be mapped to the CoAP format of the second message 620, 706 based on the mapping scheme.

In some embodiments, according to the mapping scheme, the second message 620, 706 may be configured to comprise at least one of: a) in the one or more second option fields 708, the Recursion Available indicator of the DNS response in the third value, b) in the payload field 712, at least one of: i) the additional section 711 of the DNS response, and ii) the Authoritative Answer indicator of the DNS response in the fourth value, and c) the DNS response type configured to be indicated by the CoAP response code in the header 621 of the second message 620, 706.

In some embodiments, the another node 112 is configured to, e.g. by means of an initiating unit 903 within the another node 112 configured to, initiate sending the second message 620, 706 to the node 111.

In some embodiments, the another node 112 may be further configured to, e.g. by means of a processing unit 904 within the another node 112 configured to, process the first message 601, 701 configured to be received based on the mapping scheme, and thereby extract DNS data from the first message 601, 701.

As described earlier, according to the mapping scheme, the first message 601, 701 may be configured to comprise, in the one or more first option fields 608, 612, 613, 703, at least one of: a) the operation type of the DNS query in the first value, b) the Recursion Desired indicator of the DNS query in the second value, c) the name queried by the DNS query in the name option, and d) the type of resource records configured to be requested by the DNS query in the type option.

In some particular embodiments, according to the mapping scheme, at least one of: a) the operation type of the DNS query may be configured to be mapped to the URI-path option 608, b) the name queried may be configured to be the domain name and may be configured to mapped to the URI-query option 612, and c) the type of resource records configured to be requested by the DNS may be configured to be mapped to the another URI-query option 613.

In some embodiments, the another node 112 may be configured to, e.g. by means of a determining unit 905 within the another node 112 configured to, determine, based on the processing, that the first message 601, 701 configured to be received is configured to comprise the DNS query and that the DNS response is configured to be to be sent to the node 111 with the format configured to be supported by the CoAP. To encode may be configured to be based on the determination.

In some embodiments, the first message 601, 701 may be configured to be received and the second message 620, 706 may be configured to be sent using DTLS security.

The embodiments herein may be implemented through one or more processors, such as a processor 906 in the another node 112 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the another node 112. One such carrier may be the cloud 120. It is however feasible with other data carriers such as a memory stick. The computer program code may furthermore be provided as pure program code on a server and downloaded to the another node 112.

The another node 112 may further comprise a memory 907 comprising one or more memory units. The memory 907 is arranged to be used to store obtained information, store data, configurations, schedulings, and applications etc. to perform the methods herein when being executed in the another node 112.

In some embodiments, the another node 112 may receive information from, e.g., the node 111, through a receiving port 908. In some examples, the receiving port 908 may be, for example, connected to one or more antennas in the another node 112. In other embodiments, the another node 112 may receive information from another structure in the communications network 100 through the receiving port 908. Since the receiving port 908 may be in communication with the processor 906, the receiving port 908 may then send the received information to the processor 906. The receiving port 908 may also be configured to receive other information.

The processor 906 in the another node 112 may be further configured to transmit or send information to e.g., the node 111, through a sending port 909, which may be in communication with the processor 906, and the memory 907.

Any of the receiving unit 901, the encoding unit 902, the initiating unit 903, the processing unit 904, and the determining unit 905 may be the processor 806 of the node 111, or an application running on such processor.

Those skilled in the art will also appreciate that the receiving unit 901, the encoding unit 902, the initiating unit 903, the processing unit 904, and the determining unit 905 described above may refer to a combination of analog and digital circuits, and/or one or more processors configured with software and/or firmware, e.g., stored in memory, that, when executed by the one or more processors such as the processor 906, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the another node 112 may be respectively implemented by means of a computer program 910 product, comprising instructions, i.e., software code portions, which, when executed on at least one processor 906, cause the at least one processor 906 to carry out the actions described herein, as performed by the another node 112. The computer program 910 product may be stored on a computer-readable storage medium 911. The computer-readable storage medium 911, having stored thereon the computer program 910, may comprise instructions which, when executed on at least one processor 906, cause the, at least, one processor 906 to carry out the actions described herein, as performed by the another node 112. In some embodiments, the computer-readable storage medium 911 may be a non-transitory computer-readable storage medium, such as a memory stick, or stored in the cloud space. In other embodiments, the computer program 910 product may be stored on a carrier containing the computer program, wherein the carrier is one of an electronic signal, optical signal, radio signal, or the computer-readable storage medium 911, as described above.

The another node 112 may comprise an interface unit to facilitate communications between the another node 112 and other nodes or devices, e.g., the node 111. In some particular examples, the interface may, for example, include a transceiver configured to transmit and receive radio signals over an air interface in accordance with a suitable standard.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

REFERENCES

1. DNS RFC 1035
2. Behind the Masq: https://security.googleblog.com/2017/10/behind-masq-yet-more-dns-and-dhcp.html
3. COAP RFC 7252

The invention claimed is:

1. A method performed by a node operating in a communications network, wherein the node supports operation on a Constrained Application Protocol, CoAP, and wherein the node is incapable of supporting operation on a Domain Name System, DNS, protocol, the method comprising:
   encoding a DNS query into a first message, the first message having a CoAP format supported by the CoAP, wherein the DNS query is mapped to the CoAP format based on a mapping scheme;
   initiating sending the first message to another node operating in the communications network, the another node supporting operation on the CoAP and on the DNS protocol; and
   receiving a second message from the another node, the second message having the CoAP format supported by the CoAP, and the second message comprising a DNS response to the DNS query, wherein the DNS response is mapped to the CoAP format based on the mapping scheme.

2. The method according to claim 1, wherein the method further comprises:
   processing the received second message based on the mapping scheme, and thereby extracting DNS data from the second message.

3. The method according to claim 1, wherein the first message is sent and the second message is received using Datagram Transport Layer Security, DTLS, security, wherein according to the mapping scheme, the first message comprises, in one or more first option fields, at least one of:
   a. an operation type of the DNS query in a first value;
   b. a Recursion Desired indicator of the DNS query in a second value;
   c. a name queried by the DNS query in a name option, and
   d. a type of resource records requested by the DNS query in a type option.

4. The method according to claim 1, wherein the method further comprises:

determining that the DNS query is to be sent to the another node, wherein the encoding is based on the determination.

5. A method performed by another node operating in a communications network, wherein the another node supports operation on a Constrained Application Protocol, CoAP, and operation on a Domain Name System, DNS, protocol, the method comprising:
receiving a first message from a node operating in the communications network, the node supporting operation on the CoAP, and the node being incapable of supporting operation on the DNS protocol, the received first message comprising a DNS query, the received first message having a CoAP format supported by the CoAP, wherein the DNS query is mapped to the CoAP format based on a mapping scheme;
encoding a DNS response to the received DNS query into a second message, the second message having the CoAP format supported by the CoAP, wherein the DNS response is mapped to the CoAP format based on the mapping scheme; and
initiating sending the second message to the node.

6. The method according to claim 5, wherein the method further comprises:
processing the received first message based on the mapping scheme, and thereby extracting DNS data from the first message, and
determining, based on the processing, that the received first message comprises the DNS query and that the DNS response is to be sent to the node with the CoAP format supported by the CoAP, and wherein the encoding is based on the determination.

7. The method according to claim 5, wherein the first message is received and the second message is sent using Datagram Transport Layer Security, DTLS, security, wherein according to the mapping scheme, the first message comprises, in one or more first option fields, at least one of:
a. an operation type of the DNS query in a first value;
b. a Recursion Desired indicator of the DNS query in a second value;
c. a name queried by the DNS query in a name option, and
d. a type of resource records requested by the DNS query in a type option.

8. A node configured to operate in a communications network, wherein the node is further configured to support operation on a Constrained Application Protocol, CoAP, and wherein the node is configured to be incapable of supporting operation on a Domain Name System, DNS, protocol, the node comprising:
radio circuitry; and
processing circuitry configured to:
encode a DNS query into a first message, the first message having a CoAP format supported by the CoAP, wherein the DNS query is mapped to the CoAP format based on a mapping scheme,
initiate sending the first message to another node configured to operate in the communications network, the another node being further configured to support operation on the CoAP and on the DNS protocol; and
receive a second message from the another node, the second message having the CoAP format supported by the CoAP, and the second message comprising a DNS response to the DNS query sent, wherein the DNS response is mapped to the CoAP format based on the mapping scheme.

9. The node according to claim 8, wherein the processing circuitry is further configured to process the second message based on the mapping scheme, and thereby extract DNS data from the second message.

10. The node according to claim 8, wherein the first message is sent and the second message is received using Datagram Transport Layer Security, DTLS, security.

11. The node according to claim 8, wherein, according to the mapping scheme, the first message comprises in one or more first option fields, at least one of:
a. an operation type of the DNS query in a first value;
b. a Recursion Desired indicator indicator of the DNS query in a second value;
c. a name queried by the DNS query in a name option, and
d. a type of resource records requested by the DNS query in a type option.

12. The node according to claim 11, wherein, according to the mapping scheme, at least one of:
a. the operation type of the DNS query is mapped to a Uniform Resource Identifier path, URI-path, option;
b. the name queried is a domain name and is mapped to a URI-query option, and
c. the type of resource records requested by the DNS query is mapped to another URI-query option.

13. The node according to claim 8, wherein according to the mapping scheme, the second message comprises at least one of:
a. in one or more second option fields:
i. a Recursion Available indicator of the DNS response in a third value,
b. in a payload field, at least one of:
i. an additional section of the DNS response, and
ii. an Authoritative Answer indicator of the DNS response in a fourth value, and
c. a DNS response type indicated by a CoAP response code in a header of the second message.

14. The node according to claim 8, wherein the processing circuitry is further configured to determine that the DNS query is to be sent to the another node, and to encode the DNS query based on the determination.

15. An another node configured to operate in a communications network, wherein the another node is configured to support operation on a Constrained Application Protocol, CoAP, and operation on a Domain Name System, DNS, protocol, the another node comprising:
radio circuitry; and
processing circuitry configured to:
receive a first message from a node that is configured to operate in the communications network, that is configured to support operation on the CoAP, and that is incapable of supporting operation on the DNS protocol, wherein the first message comprises a DNS query and has a CoAP format supported by the CoAP, wherein the DNS query is mapped to the CoAP format based on a mapping scheme;
encode a DNS response to the DNS query into a second message, the second message having the CoAP format supported by the CoAP, wherein the DNS response is mapped to the CoAP format based on the mapping scheme; and
initiate sending the second message to the node.

16. The another node according to claim 15, wherein the processing circuitry is further configured to:
process the first message based on the mapping scheme, and thereby extract DNS data from the first message; and determine, based on the processing, that the first message comprises the DNS query and that the DNS response is to be sent to the node with the CoAP format supported by the CoAP; and encode the DNS query based on the determination.

17. The another node according to claim 15, wherein the processing circuitry is configured to receive the first message and to send the second message using Datagram Transport Layer Security, DTLS, security.

18. The another node according to claim 15, wherein, according to the mapping scheme, the first message comprises, in one or more first option fields, at least one of:
   a. an operation type of the DNS query in a first value;
   b. a Recursion Desired indicator indicator of the DNS query in a second value;
   c. a name queried by the DNS query in a name option, and
   d. a type of resource records requested by the DNS query in a type option.

19. The another node according to claim 18, wherein, according to the mapping scheme, at least one of:
   d. the operation type of the DNS query is mapped to a Uniform Resource Identifier path, URI-path, option;
   e. the name queried is a domain name and is mapped to a URI-query option, and
   f. the type of resource records requested by the DNS query is mapped to another URI-query option.

20. The another node according to claim 15, wherein, according to the mapping scheme, the second message comprises at least one of:
   a. in one or more second option fields:
      i. a Recursion Available indicator of the DNS response in a third value,
   b. in a payload field, at least one of:
      i. an additional section of the DNS response, and
      ii. an Authoritative Answer indicator of the DNS response in a fourth value, and
   c. a DNS response type indicated by a CoAP response code in a header of the second message.

* * * * *